(12) United States Patent
Krasner

(10) Patent No.: US 6,583,757 B2
(45) Date of Patent: Jun. 24, 2003

(54) METHOD AND APPARATUS FOR SATELLITE POSITIONING SYSTEM (SPS) TIME MEASUREMENT

(75) Inventor: Norman F. Krasner, San Carlos, CA (US)

(73) Assignee: SnapTrack, Inc., San Jose, CA (US)

( * ) Notice: Subject to any disclaimer, the term of this patent is extended or adjusted under 35 U.S.C. 154(b) by 0 days.

(21) Appl. No.: 09/989,370

(22) Filed: Nov. 19, 2001

(65) Prior Publication Data

US 2002/0033767 A1 Mar. 21, 2002

Related U.S. Application Data

(63) Continuation of application No. 09/531,806, filed on Mar. 21, 2000, which is a continuation-in-part of application No. 09/074,521, filed on May 7, 1998, now Pat. No. 6,052,081, which is a continuation of application No. 08/794,649, filed on Feb. 3, 1997, now Pat. No. 5,812,087.
(60) Provisional application No. 60/125,673, filed on Mar. 22, 1999.

(51) Int. Cl.⁷ .............................. G01S 5/02; H04B 7/185
(52) U.S. Cl. .............................. 342/357.09; 342/357.1; 342/357.06; 701/213
(58) Field of Search ........................ 342/357.09, 357.1, 342/357.06; 701/213

(56) References Cited

U.S. PATENT DOCUMENTS

| | | | |
|---|---|---|---|
| 4,445,118 A | 4/1984 | Taylor et al. ................ | 342/357 |
| 4,449,830 A | 5/1984 | Bulgier ........................ | 368/119 |
| 4,734,701 A * | 3/1988 | Grobert ........................ | 342/380 |
| 5,117,232 A * | 5/1992 | Cantwell ...................... | 342/357 |
| 5,225,842 A | 7/1993 | Brown et al. ................ | 342/357 |
| 5,317,322 A | 5/1994 | Grobert ........................ | 342/378 |
| 5,317,323 A | 5/1994 | Kennedy et al. ............. | 342/457 |
| 6,317,322 B1 * | 5/1994 | Grobert ........................ | 342/378 |

(List continued on next page.)

FOREIGN PATENT DOCUMENTS

| | | |
|---|---|---|
| DE | 196 21 225 | 12/1996 |
| EP | 0508405 | 10/1942 |
| EP | 0444738 | 9/1991 |
| EP | 0545636 | 6/1993 |
| GB | 2301725 | 12/1996 |
| WO | WO 98/25158 | 6/1998 |

OTHER PUBLICATIONS

PCT International Search Report, date mailed Aug. 18, 2000, PCT/US00/07683, 7 pages.
Notification of Transmittal of International Preliminary Examination Report for Int'l Appln No. PCT/US00/07683, mailed Mar. 08, 2001 (5 pages).

(List continued on next page.)

Primary Examiner—Theodore M. Blum
(74) Attorney, Agent, or Firm—Blakely, Sokoloff, Taylor & Zafman LLP

(57) ABSTRACT

A method and apparatus for measuring time related to satellite data messages which are used with satellite positioning systems (SPS). In one method, a first record of at least a portion of a satellite data message is received at an entity, which is typically a basestation. The first record is compared with a second record of the satellite data message, where the first record and the second record overlap at least partially in time. Then a time is determined from this comparison, and this time indicates when the first record (or the source from which the first record was obtained) was received at a remote entity which is typically a mobile SPS receiver. Various other methods of the invention are described and various apparatuses of the invention are also described. The methods and apparatuses measure time of day using SPS signals without reading the satellite data messages which are transmitted as data within these signals. The methods and apparatuses are suitable for situations in which the received signal level is too weak to allow reading of the satellite data messages.

22 Claims, 16 Drawing Sheets

U.S. PATENT DOCUMENTS

| | | | | |
|---|---|---|---|---|
| 5,319,374 A | * | 6/1994 | Desai et al. | 342/387 |
| 5,379,224 A | | 1/1995 | Brown et al. | 364/449 |
| 5,420,592 A | | 5/1995 | Johnson | 342/357 |
| 5,510,797 A | * | 4/1996 | Abraham et al. | 342/352 |
| 5,521,887 A | | 5/1996 | Loomis | 368/47 |
| 5,570,097 A | * | 10/1996 | Aguado | 342/357 |
| 5,625,556 A | * | 4/1997 | Tanky et al. | 364/423.09 |
| 5,640,442 A | * | 6/1997 | Fitzgerald et al. | 379/57 |
| 5,751,246 A | | 5/1998 | Hertel | |
| 5,812,087 A | | 9/1998 | Krasner | |
| 5,841,026 A | * | 11/1998 | Kirk et al. | 342/358 |
| 5,923,703 A | * | 7/1999 | Pon et al. | 375/209 |
| 6,052,081 A | * | 4/2000 | Krasner | 342/357.02 |
| 6,459,407 B1 | * | 10/2002 | Akopian et al. | 342/357.12 |

OTHER PUBLICATIONS

F.H. Raab et al., "An Application of the Global Positioning System to Search and Rescue and Remote Tracking," *Navigation; Journal of the Institute of Navigation*, vol. 24, No. 3 (Fall 1977), pp. 216–228.

"Navstar GPS User Equipment Introduction", Public Release Version (Feb. 1991), pp. 12–10 to 12–21.

PCT International Search Report for Int'l Appln. No. PCT/US98/01476 mailed Jul. 8, 1998.

* cited by examiner

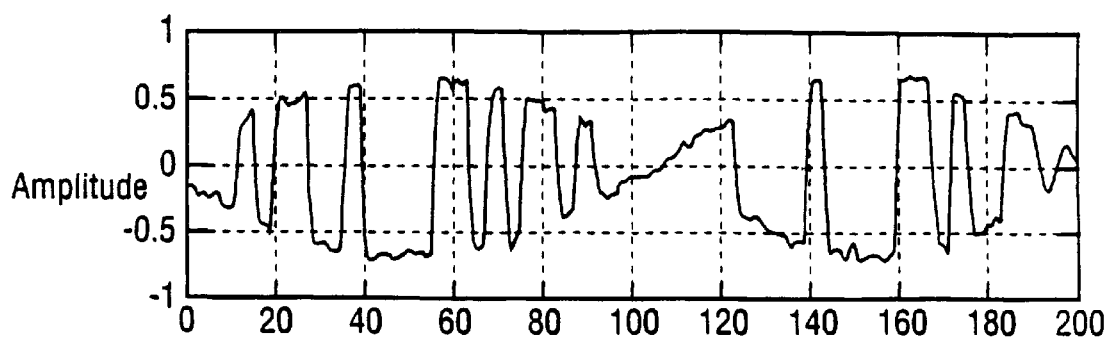
FIG. 10A Real Component of Signal with PN Removed
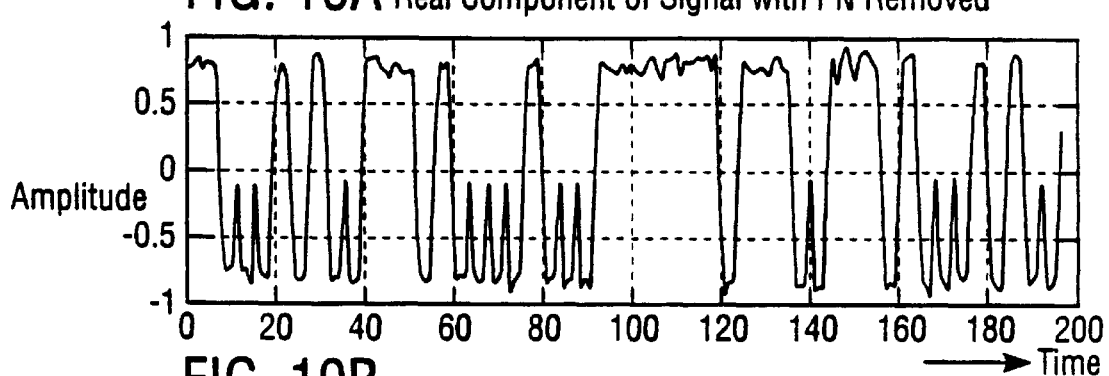
FIG. 10B Differentially Demodulated Signal
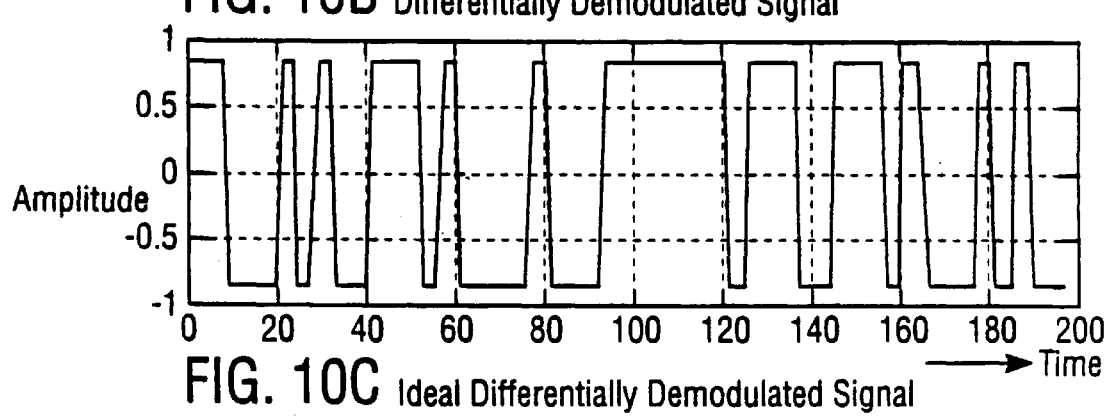
FIG. 10C Ideal Differentially Demodulated Signal
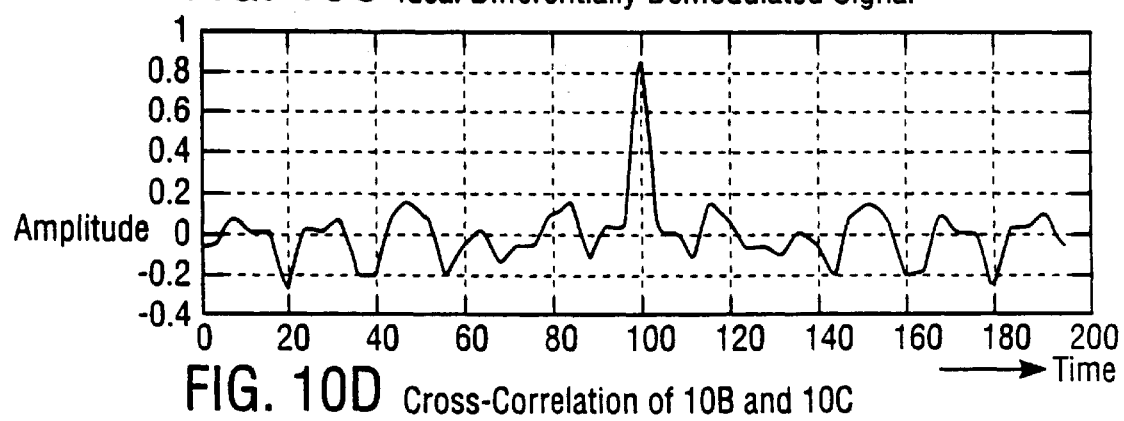
FIG. 10D Cross-Correlation of 10B and 10C

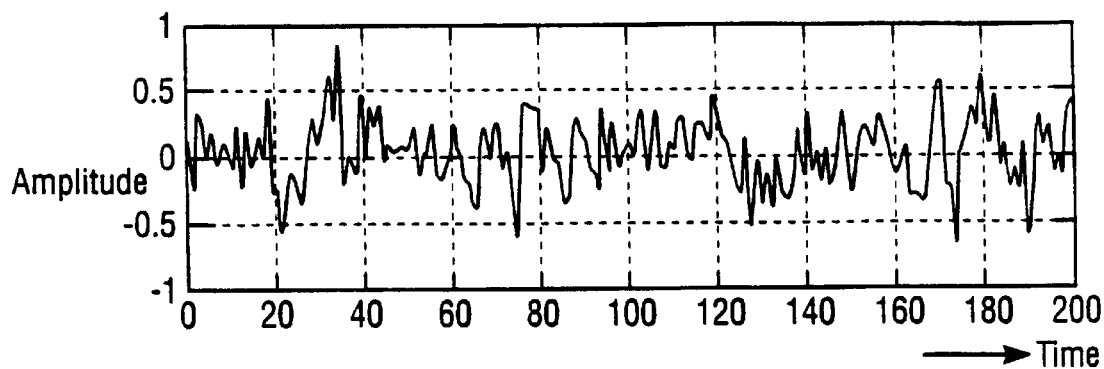
FIG. 11A  Real Component of Signal with PN Removed
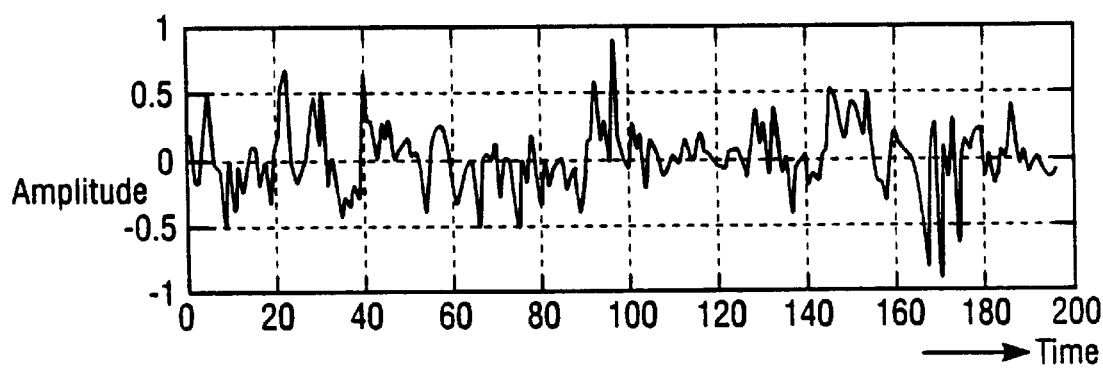
FIG. 11B  Differentially Demodulated Signal
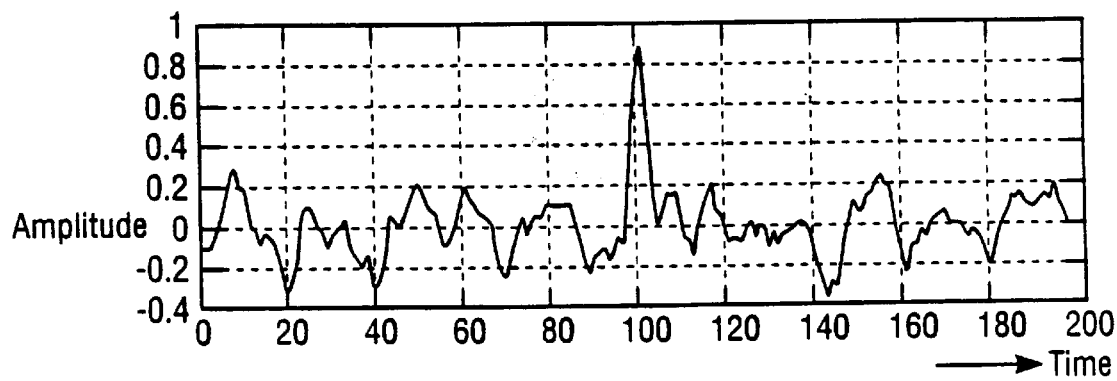
FIG. 11C  Cross-Correlation of 11B with 11C

METHOD AND APPARATUS FOR SATELLITE POSITIONING SYSTEM (SPS) TIME MEASUREMENT

This application is a continuation of U.S. patent application Ser. No. 09/531,806, filed Mar. 21, 2000, which is a continuation-in-part (CIP) of provisional patent application Ser. No. 60/125,673, filed Mar. 22, 1999 and which is entitled "Method and Apparatus for Satellite Positioning System (SPS) Time Measurement." This application hereby claims the benefit of the filing date of this provisional patent application.

The present invention relates to methods and systems which use received signals from Satellite Position Systems (SPS) to locate themselves or to determine time-of-day. This invention is a continuation-in-part of U.S. patent application Ser. No. 09/074,521, filed May 7, 1998 now U.S. Pat. No. 6,052,081 by Norman Krasner, which is a continuation of U.S. patent application Ser. No. 08/794,649, filed Feb. 3, 1997, which is now U.S. Pat. No. 5,812,087 (referred to as the "Parent Patent"). The Parent Patent is hereby incorporated herein by reference. The disclosure in patent application Ser. No. 08/842,559 filed Apr. 15, 1997 is also incorporated herein by reference.

In most situations, the methods of the Parent Patent work reliably, allowing one system (e.g. a server system) to determine a time of capture of SPS signals (such as, for example, Global Positioning System (GPS) signals) at another system (e.g. a mobile SPS receiver/client system).

In most situations of interest the time coordination method of this invention (termed "pattern matching") works reliably. In some unusual situations, there are extremely long latencies in transmitting the signal between the mobile (e.g. mobile unit 453 of FIG. 6 of the Parent Patent) and the server (e.g. basestation 463 of FIG. 6 of the Parent Patent). This can arise if the link utilizes packet communications which allow arbitrarily long routing delays. On rare occurrences such packets may arrive after a very long period of time. Such a long latency would require that the server compare the received pattern from the mobile with a very long record stored at the server. This may be computationally complex and may require a considerable amount of time to perform the necessary computations. In addition, long latencies may give rise to ambiguities associated with the repetitions in the data patterns. For example, a substantial portion of the U.S. GPS data signal repeats at 30 second intervals, and small portions may repeat at 6 second intervals. In such circumstances the pattern match procedure may produce ambiguous results.

SUMMARY OF THE INVENTION

The present invention provides methods and apparatuses for measuring time related to satellite data messages which are used with satellite position systems, such as GPS or Glonass. A method in one embodiment comprises the steps of: (1) receiving, at an entity, a first record of at least a portion of a satellite data message; (2) comparing the first record with a second record of the satellite data message, where the first record and the second record overlap at least partially in time and where the comparing is performed after determining an estimated time when the first record was received; and (3) determining a time from the comparing, where the time indicates when the first record (e.g., the source of the first record) was received at a remote entity. In one example of this embodiment, the remote entity is a mobile SPS receiver and the entity is a basestation which communicates with the mobile SPS receiver through a wireless (and perhaps also wired) link. A method of the present invention may be performed exclusively at the basestation. In an alternative embodiment, the comparison may be performed and then the estimated time when the first record was received is used to verify that the time determined from the comparing is correct.

An embodiment of the present invention for establishing receiver timing is for the receiver to form an estimate of a portion of the satellite data message and transmit this estimate to the basestation. At the basestation this estimate is compared to a record of the satellite data message received from another GPS receiver or source of GPS information. This record is assumed to be error free. This comparison then determines which portion of the basestation's message most closely matches the data transmitted by the remote unit. Since the basestation has read the satellite data message without error it can associate each data bit of that message with an absolute time stamp, as seen by the transmitting satellite. Hence the comparison results in the basestation assigning an appropriate time to the estimated data transmitted by the remote. This time information may be transmitted back to the remote, if desired.

A variation on the above approach is to have the basestation send a clean record of the satellite data message to the remote plus the absolute time associated with the beginning of this message. In this case the remote entity compares this record to the estimate of this data which it forms by processing a GPS signal which it receives. This comparison will provide the offset in time between the two records and thereby establish an absolute time for the locally collected data.

BRIEF DESCRIPTION OF THE DRAWINGS

FIGS. 10A, 10B, 10C, and 10D show examples of sampled SPS signals after various stages of signal processing according to the present invention.

FIGS. 11A, 11B, and 11C show further examples of sampled SPS signals after various stages of signal processing according to the invention.

DETAILED DESCRIPTION OF THE PREFERRED EMBODIMENT

Various methods and apparatuses for measuring time related to satellite data messages for use with satellite positioning systems are described below. The discussion of the invention focuses upon the United States Global Positioning Satellite (GPS) system. However, it should be evident that these methods are equally applicable to similar satellite positioning systems, such as the Russian Glonass system. Moreover, it will be appreciated that the teachings of the present invention are equally applicable to positioning systems which utilize pseudolites or a combination of satellites and pseudolites. Moreover, the various architectures for basestations and mobile SPS receivers are provided for illustrative purposes rather than to be construed as limitations of the present invention.

Figure 1A:
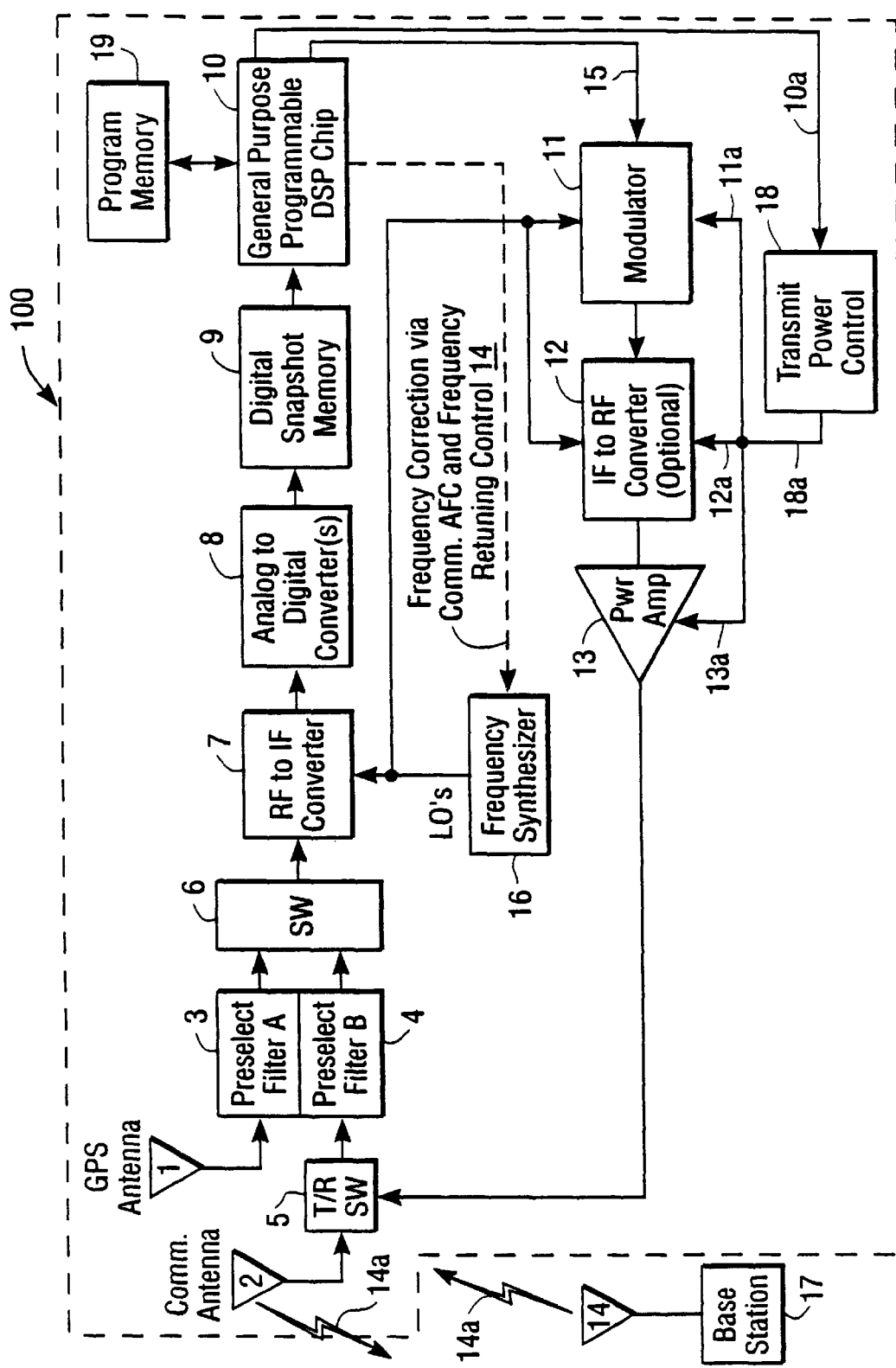
FIG. 1A is a block diagram of major components of a combined mobile SPS and communication system which can receive SPS signals and establish communication with a basestation.
Figure 2:
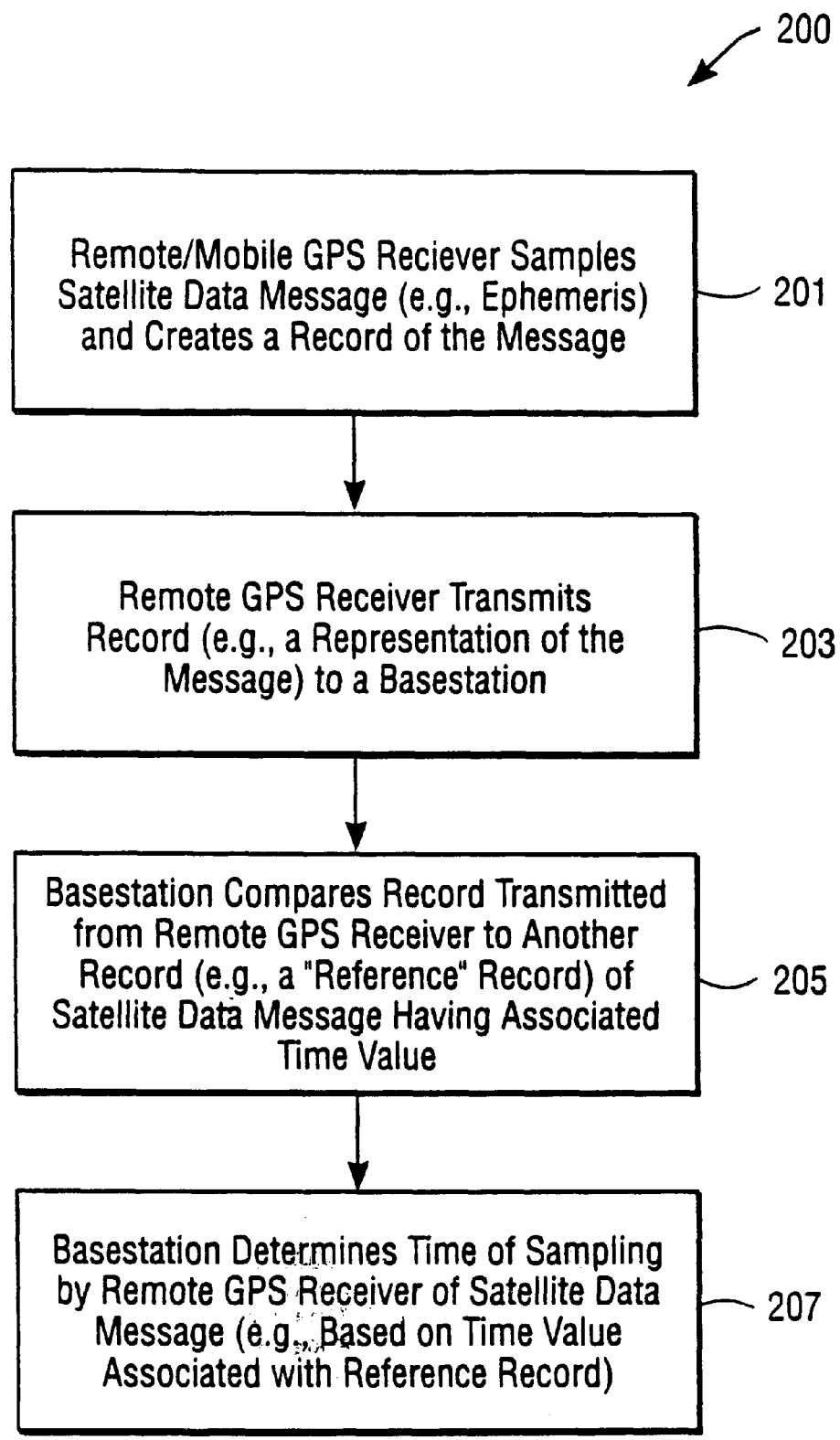
FIG. 2 is a flowchart which illustrates one method of the present invention.

FIG. 2 shows a generalized method of the present invention which may be utilized with a mobile SPS receiver which is combined with a mobile communication receiver and transmitter, such as that shown in FIG. 1A. The mobile GPS receiver 100 shown in FIG. 1A samples the satellite data message, such as ephemeris, and creates a record of the message in step 201. Next in this method 200, the remote or mobile GPS receiver transmits this record to a basestation, such as the basestation shown in FIG. 5A or 5B in step 203. This record is typically some representation of the message received by the mobile SPS receiver. In step 205, the basestation compares the record transmitted from the mobile SPS receiver to another record which may be considered a reference record of the satellite data message. This reference record has associated time values wherein various segments of the satellite data message have specified "reference" times associated therewith. In step 207, the basestation determines the time of sampling by the mobile GPS receiver of the satellite data message. This determination is based upon a time value which is associated with the reference record and this determination will indicate the time when the record or the source of the record was received by the mobile GPS receiver. In the embodiments shown in FIGS. 12A and 12B, the comparison of operation 205 is aided by determining an estimate of the time of receipt of the record of SPS signals at the mobile SPS receiver. This estimate may be used to limit the range of the comparison of the record to a reference or may be used to verify the result of the comparison. This will normally improve the speed of the comparison operation and also ensure the accuracy of the result (where there may be unusually long transmission latencies between recording the record at the mobile and performing the comparison operation).

Figure 7:
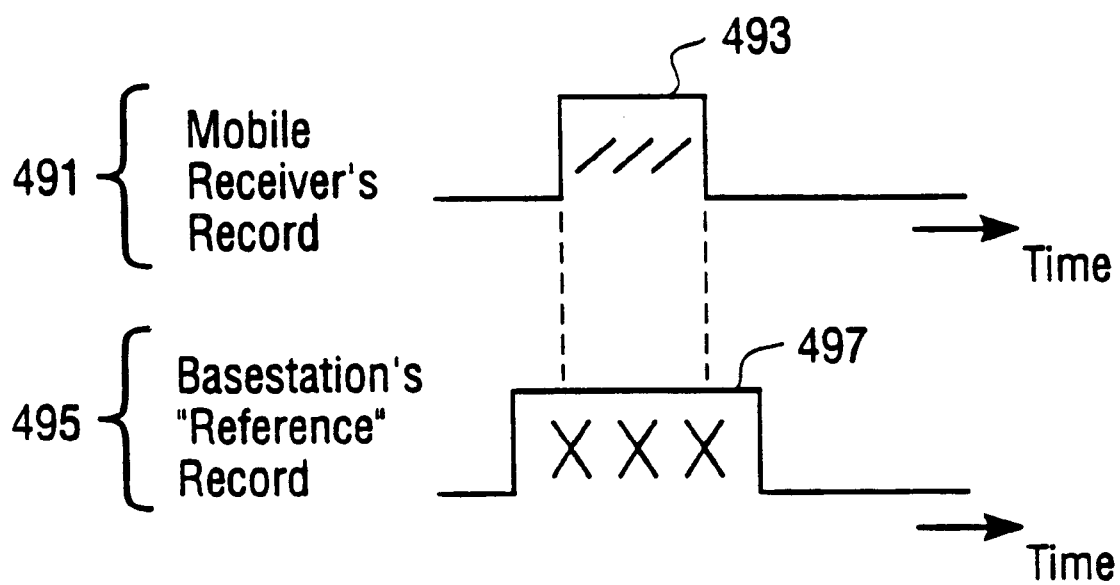
FIG. 7 shows a simplified view of the pattern matching typically performed in the present invention in order to determine time of receipt of a satellite data message at a mobile SPS receiver.

FIG. 7 illustrates in a simplified way the comparison operation in step 205 of FIG. 2. In particular, FIG. 7 shows the attempted comparison between the mobile receiver's record and the basestation's reference record shown respectively as records 491 and 495. The horizontal axes for both records indicate time. There is a portion 493 of the mobile's record which represents the portion transmitted to the basestation for purposes of comparison. Typically, the basestation will have a corresponding portion 497 which will overlap at least partially in time with the record received from the mobile receiver. In FIG. 7, this overlap is complete in that the reference record provides the satellite data message throughout the entire interval of the mobile receiver's record. However, this is only one example and the overlap may be such that only a portion of the mobile receiver's record overlaps with the reference record from the basestation.

Figure 3:
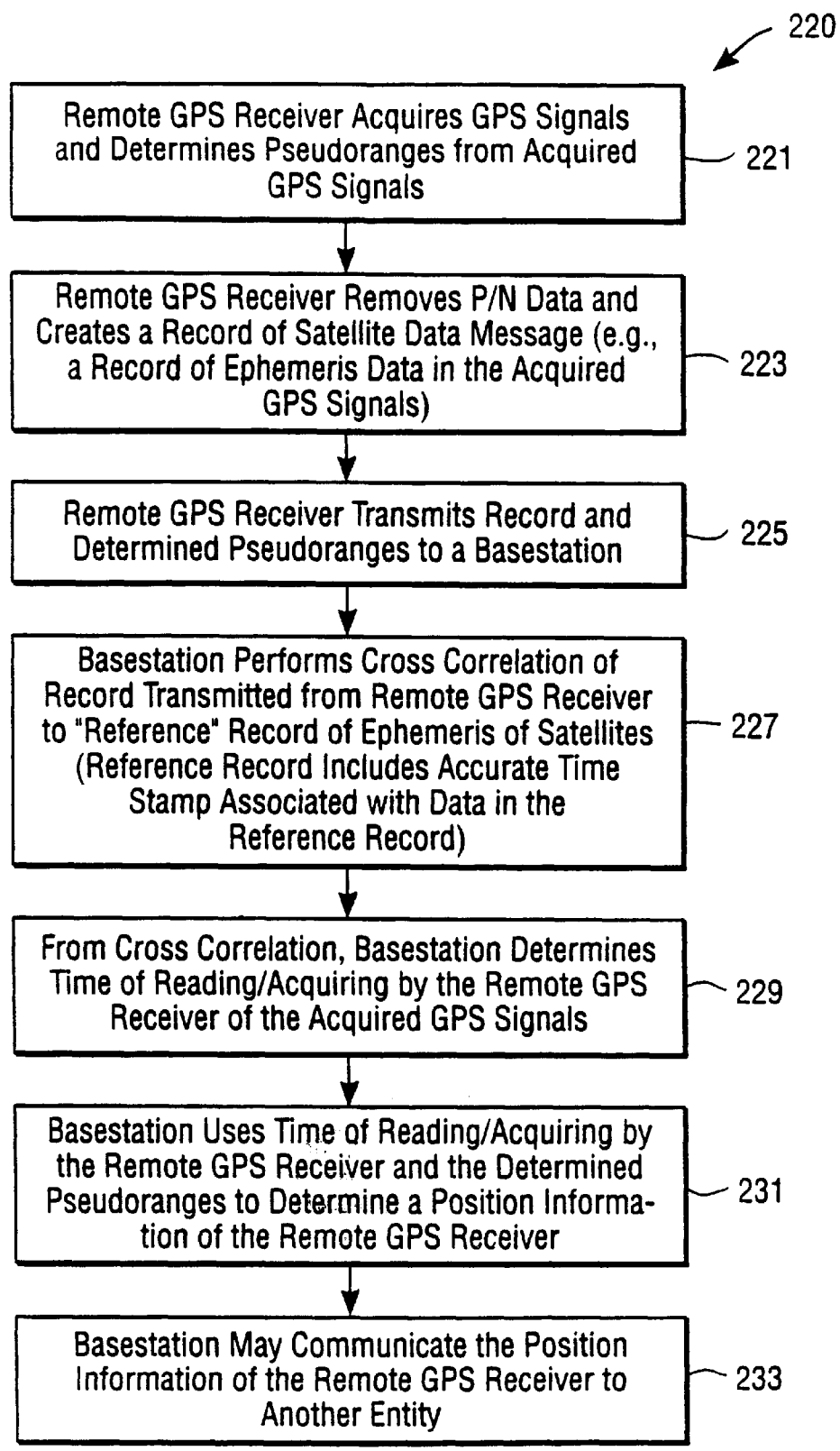
FIG. 3 is a flowchart which shows another method of the present invention.

FIG. 3 illustrates in further detail a method 220 of the present invention for measuring time related to satellite data messages for use with a satellite positioning system. The mobile or remote GPS receiver acquires in step 221 GPS signals and determines pseudoranges from those acquired GPS signals. In step 223, the mobile GPS receiver removes the PN data and creates a record of the satellite data message from the acquired GPS signals used to create or determine the pseudoranges. This record is typically some representation of the ephemeris data in the acquired GPS signals and typically represents an estimate of the data. In step 225, the mobile GPS receiver transmits the record and the determined pseudoranges to a basestation, such as the basestation shown in FIG. 5A or 5B.

In step 227, the basestation performs a cross-correlation of the record transmitted from the mobile GPS receiver to a reference record of ephemeris of the satellites. This reference record typically includes an accurate time stamp associated with the data in the reference record (e.g. each bit of data in the reference record has an associated time value or "stamp"), and it is this time stamp which will be used to determine the time of receipt by the mobile GPS receiver of the originally acquired GPS signals. In step 229, the basestation determines from the cross-correlation operation the time of acquiring by the remote GPS receiver of the acquired GPS signals. The basestation then uses in step 231 the time of the acquiring by the remote GPS receiver of the GPS signals and uses the determined pseudoranges to determine a position information, which may be a latitude and longitude of the remote/mobile GPS receiver. The basestation, in step 233, may communicate this position information of the remote GPS receiver to another entity, such as a computer system coupled through a network, such as the Internet, or an intranet, to the basestation. This will be described further below in conjunction with FIGS. 5B and 6.

Figure 8A:
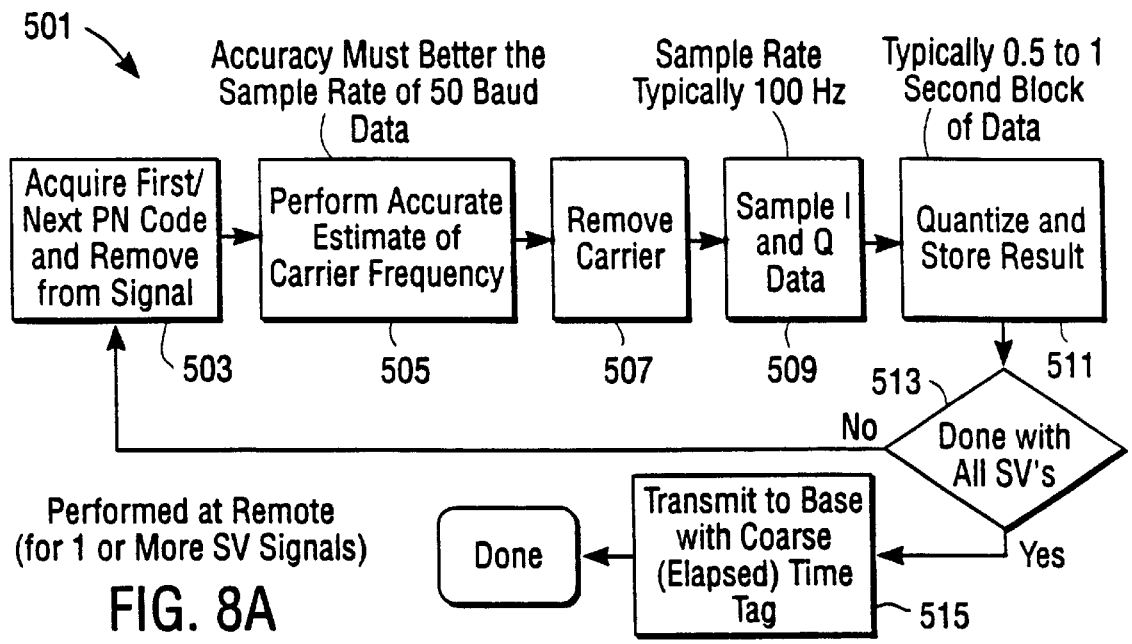
FIG. 8A shows a method performed by a mobile SPS receiver in another particular embodiment of the invention.
Figure 8B:
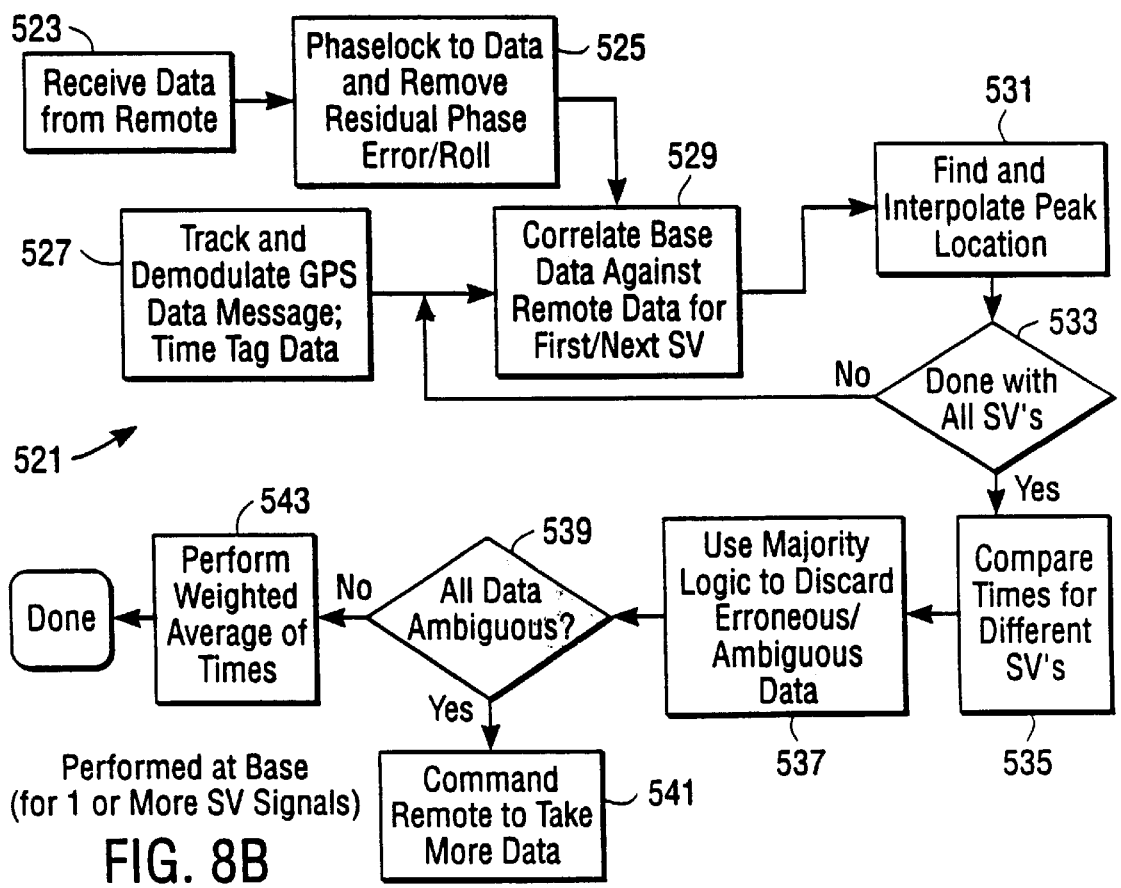
FIG. 8B shows a corresponding method performed by a basestation.

Below we explain in further detail several methods for estimating the satellite data at the remote SPS receiver. The methods fall into two classes: one which performs differential demodulation and soft decision of the data (after PN is removed) and the other which samples the raw I/Q data after PN is removed. The first method is shown diagrammatically in FIGS. 4A and 4B and the second is indicated in FIGS. 8A and 8B. Note that the object here is to determine the difference in times of arrival between the reception of the signal at the remote and at the basestation. Since the basestation is presumed to have the precise time, this difference in time will determine the precise time of reception of data at the remote. As explained below, the two approaches differ by the amount of processing that must be done by the remote (mobile SPS receiver) and the amount of information that must be transferred from the remote to the basestation over a communication link. In essence, there is a tradeoff in the processing burden at the remote versus the quantity of data that must be passed over the link.

Figure 9:
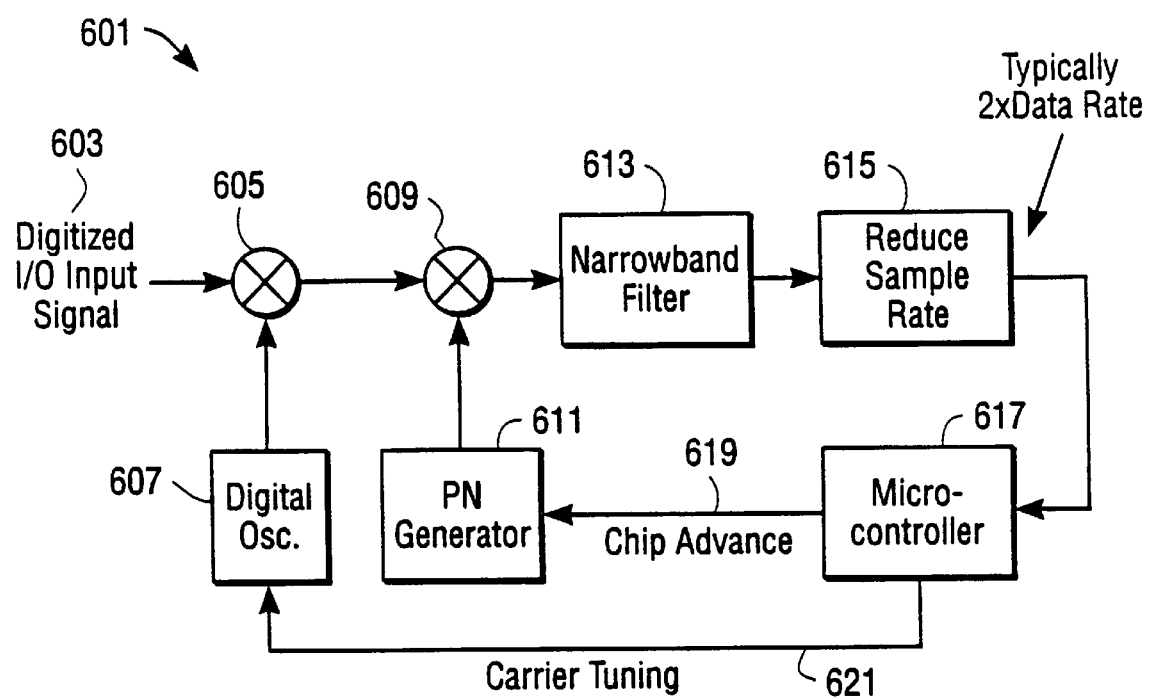
FIG. 9 shows the simplified structure of a conventional GPS receiver.

Before describing the details of the procedures in FIGS. 4A and 4B and FIGS. 8A and 8B, a review of conventional GPS operation is provided to provide a contrast to the methods of this invention. A simplified version of a conventional GPS receiver 601 is shown in FIG. 9.

This conventional receiver 601 receives digitized I/Q input signals 603 from a GPS RF front end (e.g. downconverter and digitizer) and mixes in mixer 605 these input signals 603 with oscillator signals from digital oscillator 607. The output from mixer 605 is then mixed in mixer 609 with the output of a PN generator 611 which is controlled for chip advance by signals 619 from the microcontroller 617. The microcontroller 617 also controls the digital oscillator 607 in order to translate the signal to near baseband.

In the operation of a conventional GPS receiver, a signal received from a GPS satellite in the absence of noise has the form $$y(t) = A\, P(t) D(t) \exp(j 2\pi f_0 t + \phi), \quad \text{(eq. 1)}$$

where P(t) is a 1023 length repeating binary phase-shift keyed pseudorandom sequence (chip rate 1.023 Mchips/sec) having values±1 and D(t) is a 50 baud data signal aligned with the beginning of the PN framing, again assuming values±1. After translating the signal to near baseband (e.g. by the mixer 605), the PN code is normally removed by using a correlator (which may be considered to include elements 609, 611, 613, 615 and 617 of FIG. 9). This device locally reproduces the code P(t) (for the given satellite) and determines the relative phasing of the received PN with the locally generated PN. When phase aligned, the correlator multiplies this signal by the locally generated reference resulting in the signal form:

$$P(t) \times y(t) = P(t) A P(t) D(t) \exp(j 2\pi f_0 t + \phi) = A D(t) \exp(j 2\pi f_0 t + \phi) \quad \text{(eq. 2)}$$

At this point the signal is narrowband filtered (e.g. in filter 613) to remove noise outside the band of the data signal D(t). The sample rate may then be reduced to a small multiple of the data rate by sampler 615. Thus, the time variable t in the right hand side of equation (2) takes on values of the form mT/K, m=0,1,2, . . . where K is a small integer (e.g. 2) and T is the bit period.

The samples of data at this point then are used for performing the PN tracking operations, carrier tracking and data demodulation. This is normally done by software algorithms in a microcontroller, but may alternatively be done in hardware. In FIG. 9 the microcontroller 617 feeds back correction signals 621 and 619 to the digital oscillator and PN generator respectively in order to keep the locally generated carrier signals and PN signals in phase synchronism with the received signal. This operation is normally done in parallel for a multiplicity of simultaneously received GPS signals (typically 4 or more GPS signals from 4 or more GPS satellites).

Now, in some circumstances (e.g. a low signal to noise ratio ("SNR")) the GPS signal may be so weak that the data D(t) cannot be extracted with high reliability. As described previously, a conventional GPS receiver needs to read this data in order to determine a universal time as well as provide a position fix. An alternative approach, provided by the present invention, in this low SNR situation is for the remote to work together with a basestation, the latter of which has access to this satellite data information. The remote sends information to the basestation that allows it to compute the time associated with the original reception of such data by the remote. An alternative configuration exists in which the basestation sends information to the remote in order for it to compute this time of reception. We mainly consider the first case.

It should be noted that time coordination between the base and the remote may, in some cases, be achieved by sending accurate timing signals (e.g. pulses or specialized waveforms) across a communication link and accounting for any transit time by either a priori knowledge of the link latencies or measuring a round trip delay (assuming a two-way symmetric link). However, there are many circumstances where this approach is impractical or impossible. For example, many links include packetized protocols in which latencies may be variable from one transmission to another and span many seconds.

The approach of this invention is for the remote to form an estimate of a portion of the data sequence D(t) or an estimate of a processed version of it, and transmit this data to the basestation. This data sequence can be compared against a similar but much higher fidelity signal generated at the basestation. The two sequences are slid in time relative to one another until the best match occurs, according to a given metric, such as minimum mean-squared error. This "correlation" procedure is very similar to that used by GPS receivers in order to synchronize to the PN spreading sequences; here, however, the operation is done on much lower rate data signals and, furthermore, the pattern of such signals is constantly changing and may be unknown a priori.

Since the basestation presumably knows the precise time associated with each element of the message, it may utilize this knowledge plus the aforementioned comparison to ascertain the original time associated with the signal received at the remote.

Thus, the main problem lies in the estimation at the remote of the data sequence D(t) or a derivative thereof.

One particular embodiment of the invention, shown in FIGS. 8A and 8B, for estimating the data sequence is to simply sample and store a record of the signal after the PN is removed, e.g. as shown in equation (2). Here the signal is assumed to be sampled at a small multiple of the data rate; a 100 sample per second rate may be suitable for this purpose. Note that both I and Q tributaries must be sampled. Also, a record of length of around 25 or more data symbols (0.5 seconds) should be taken in order to make it likely that the data pattern is unique for the purpose of identification at the basestation. Note from equation (2) that a small residual carrier $f_0$ and unknown carrier phase $\phi$ may still be present. It is highly beneficial that the carrier frequency be known to an accuracy better than ±one-half the sample rate of the data signal; otherwise the carrier may effectively introduce phase reversals of the data signal and so corrupt the data.

FIG. 8A illustrates a method performed in the mobile GPS receiver according to this particular embodiment. The receiver acquires the first (or next if not the first) PN code for the particular GPS signal and removes the PN code from the signal in step 503. Then, the receiver performs an accurate estimate of carrier frequency in step 505 and them removes the carrier from the inputted signal in step 507. Then the I and Q data is sampled and quantized in steps 509 and 511, and this quantized result is saved as a record of the corresponding satellite data message and then transmitted to the basestation (perhaps also with the corresponding pseudorange from the GPS satellite transmitting the particular GPS signal). In step 513, the receiver determines whether the receiver has performed steps 503, 505, 507, 509, and 511 (and hence determined a record) for all satellites of interest (e.g. all satellites in view of the mobile GPS receiver or at least four satellites in view). If a record of the satellite data message has been determined from each satellite of interest, then the GPS receiver transmits (in step 515) the records with an elapsed time tag to the basestation. The elapsed time tag may be used by the basestation to estimate and/or select the "reference" record at the basestation which will be compared (e.g. by correlation) to the record. If the receiver has not determined a record from each satellite of interest, then the mobile GPS receiver proceeds from step 513 back to step 503, and repeats steps 503, 505, 507, 509, and 511 in order to determine a record of the satellite data message received from the next satellite of interest. An example of a GPS receiver (and communication receiver/transmitter) which may perform the method of FIG. 8A is shown in FIG. 1A, and this GPS receiver is described in further detail below.

The basestation when receiving this information can refine the frequency estimate and remove the carrier and then determine relative timing by cross-correlating this data against similar data extracted from a high fidelity signal received from a GPS receiver with a clear view of the sky (or received from some other source of high fidelity GPS signals, such as from the Internet or from a GPS ground control station).

FIG. 8B shows a method 521 performed by the basestation upon receiving the record of the satellite data message transmitted from the remote. In step 523, the basestation receives a record corresponding to a satellite data message, and then in step 525 phaselocks to the record and removes any residual phase error/roll in step 525. Contemporaneously with steps 523 and 525, the basestation will typically be tracking and demodulating GPS data messages and applying time tags to these data messages in order to provide an accurate time value in association with various intervals of the satellite data message which has been demodulated. This is shown in step 527. Typically, the basestation will be performing the tracking and demodulation of satellite data messages on an ongoing basis such that a continuous reference record is being generated and a running sample of this "reference" record is stored at the basestation. It will be appreciated that this running record of the reference may be maintained for a time period of up to perhaps 10 to 30 minutes prior to the current time. That is, the basestation may maintain a copy of the reference record for as long as 30 minutes before discarding the oldest portion of the reference record and in effect replacing it with the newest portion in time.

In step 529, the basestation correlates the base's reference record against the reference record from the remote for the first (or the next, if not the first) satellite data message from the first (or next) satellite. This correlation is effectively a comparison between the two records in order to match the patterns such that the basestation may determine the time accurately when the remote received the record (which is typically, in effect, the time when the source of that record was received by the remote since the record is itself an estimate of the source). It will be appreciated that as used to describe the present invention, the time of receipt of the record by the remote effectively is the time of receipt of the source of the record at the remote. At step 531, the basestation finds and interpolates the peak location which indicates the time at which the remote received the record for the current satellite and its corresponding satellite data message. In step 533, the basestation determines whether all times associated with all corresponding records have been determined for all satellites of interest. If not, the processing proceeds back to step 529 and the process is repeated for each record received from the remote. If all records have been processed in order to determine corresponding times for all satellites of interest and their corresponding satellite data messages, then processing proceeds from step 533 to step 535, wherein the times are compared for the different satellites of interest. In step 537, majority logic is used to discard erroneous or ambiguous data and then in step 539 it is determined whether all data is ambiguous. If all data is ambiguous, the basestation commands the mobile GPS receiver to take further data by transmitting a command to the communication receiver in the mobile GPS unit. If all data is not ambiguous, then in step 543 the basestation performs a weighted average of the times to determine an average time of receipt of the satellite data messages at the mobile GPS receiver. It will be appreciated that in certain circumstances such as those when a sample of GPS signals is digitized and stored in a digital memory for further processing that there will be in effect one time of receipt as long as that sample is of a short duration. In other instances, such as those involving serial correlation where one satellite at a time is processed and signals from that satellite are acquired and a record is made of that signal and then next in time another satellite signal is acquired, in this case, there may be multiple times of receipt and the basestation may determine each of those times and use them in the manner described below.

It will be appreciated that the time of receipt of the record in conjunction with the pseudoranges which are typically transmitted from the mobile GPS receiver, at least in some embodiments, will be used by the basestation to determine a position information, such as a latitude and longitude and/or an altitude of the mobile GPS receiver.

In some cases it may be difficult to determine the residual carrier frequency (in step 525) to sufficient accuracy and then a differential demodulation of the data from the remote and the locally received data may precede the cross-correlation. This differential demodulation is further described below in conjunction with FIGS. 4A and 4B.

Figure 4A:
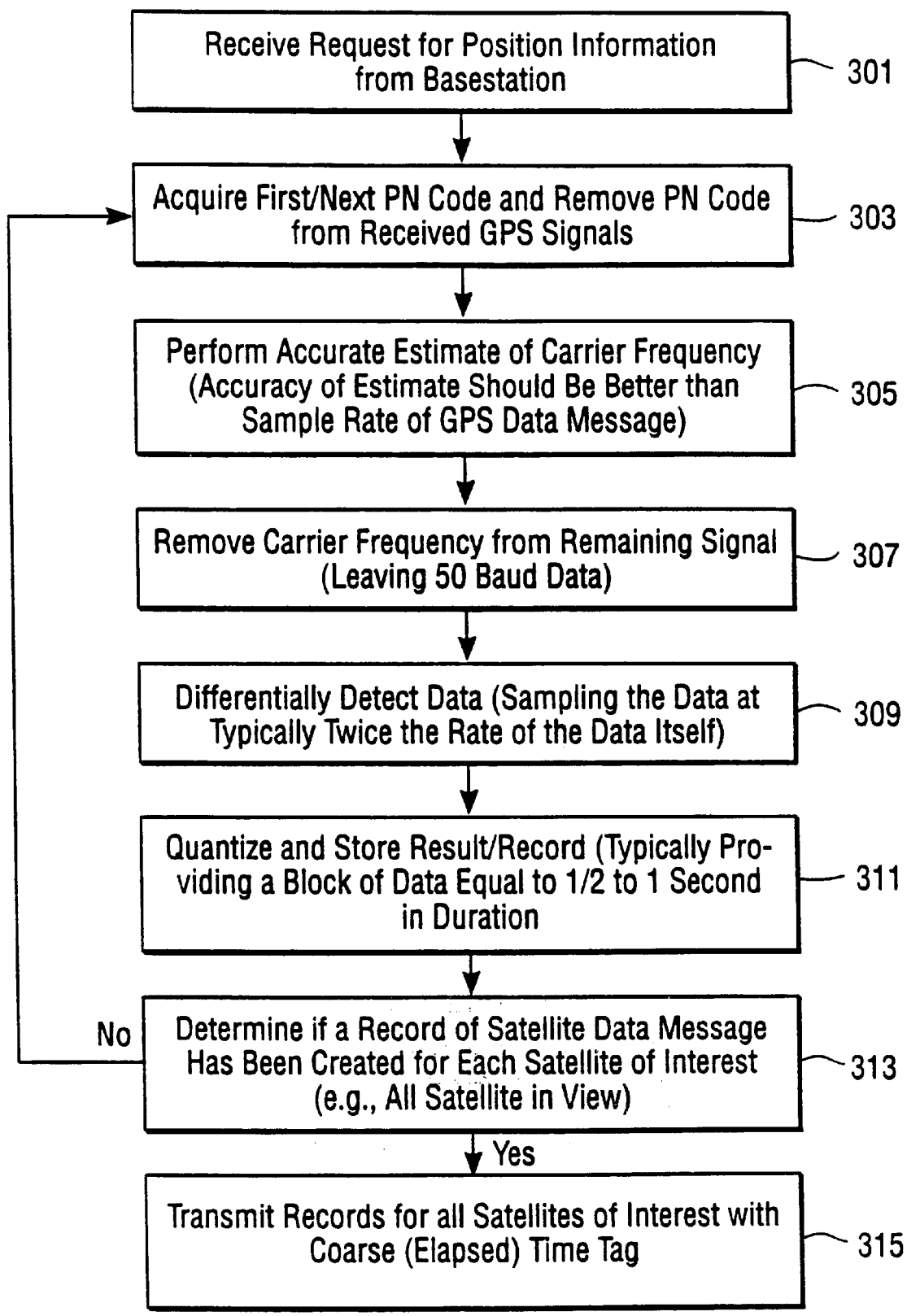
FIG. 4A shows a method performed by a mobile SPS receiver in one particular method of the present invention.
Figure 4B:
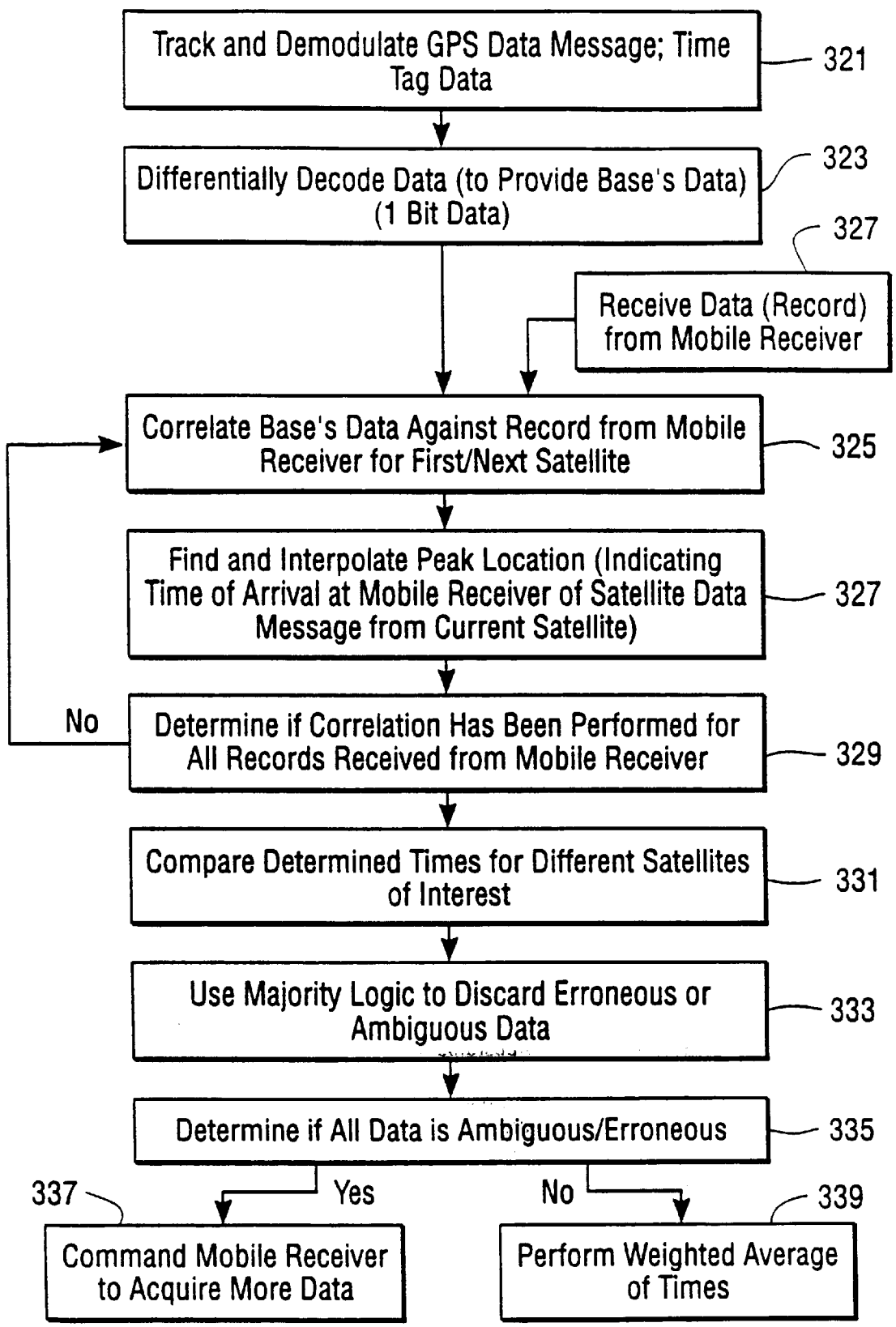
FIG. 4B shows a corresponding method performed by a basestation.

If the communication link capacity (between the mobile GPS receiver and the basestation) is low, it is advantageous for the remote to perform additional processing on the despread signal (the signal with PN removed). A good approach toward this end, as illustrated in FIGS. 4A and 4B, is for the remote to differentially detect this signal by performing a delay-multiply operation on the data signal, with delay set to a bit period (20 milliseconds) or a multiple thereof. Thus, if the baseband signal of equation (2) is represented as $$z(t)=A\ D(t)\exp(j2\pi f_0 t+\phi) \qquad (eq.\ 3)$$

then the appropriate operation would be:

$$z(t)z(t-T)^* = A^2 D(t)\ D(t-T)\exp(j2\pi f_0 T) = A^2 D_1(t)\exp(j2\pi f_0 T) \qquad (eq.\ 4)$$

where the asterisk represents complex conjugate, T is the bit period (20 msec) and $D_1(t)$ is a new 50 baud sequence formed by differentially decoding the original data sequence (e.g. mapping a transition to a −1 and no transition to a +1). Now if the carrier frequency error is small compared to the reciprocal of the symbol period, then the latter exponential term has a real component that dominates the imaginary component and only the real component may be retained yielding the result $A^2 D_1(t)$. Thus, the operation of equation (4) produces a real signal stream instead of the complex signal stream of the method shown in FIG. 8A. This, by itself, halves the required transmission message length when the record is transmitted across the communication link. Since the signal $A^2 D_1(t)$ is at baseband, it may be sampled at a somewhat smaller rate than that of the method shown in FIG. 8A. It is possible, also, to retain only the sign of this data, thereby reducing the amount of data to be transmitted.

However, this approach will reduce the ability of the basestation to resolve time much better than one symbol period (20 msec). Here we should note that the PN code repeats at a 1 msec interval and hence will not be useful by itself for further resolving this measurement error.

FIG. 4A illustrates the processing steps performed in the mobile GPS receiver, and FIG. 4B illustrates the processing steps performed at the basestation according to this particular embodiment of the present invention. The mobile GPS receiver receives in step 301 a request for position information from a basestation. It will be appreciated that in a typical embodiment, this reception will occur by a communication receiver such as that shown within the mobile GPS receiver 100 in FIG. 1A. In response to that request for position information, the mobile GPS receiver in step 303 acquires the first (or the next, if not the first) PN code from a GPS signal and removes that PN code from the received GPS signal. In step 305, the remote performs an accurate estimate of the carrier frequency; the accuracy of this estimate should be better than the sample rate of the GPS data message, which is typically 100 Hz in the case of 50 baud GPS data. Step 305 may be performed by using conventional frequency measurement systems in GPS receivers; these frequency measurement systems typically use carrier tracking loops which often include phaselock loops to extract the carrier and then a frequency measurement circuit or alternatively, a frequency tracking loop with a phaselock loop. In step 307, the carrier frequency is removed by the mobile GPS receiver from the remaining signal, leaving the 50 baud data. Then in step 309, the remaining data is differentially detected by sampling the data at typically twice the rate of the data itself. It will be appreciated that rather than differentially detect the data as in step 309, the remote GPS receiver may transmit the data itself to the basestation and allow the basestation to perform the differential detection and quantization steps of steps 309 and 311. The mobile GPS receiver continues, in step 311, by quantizing and storing the result which is a record of the satellite data message typically having a duration in time of from one-half to one second. Then in step 313, the mobile GPS receiver determines if a record of satellite data message has been created for each satellite of interest, which may be all satellites in view or at least four satellites in view. If a record has not been created for each satellite of interest and its corresponding satellite data message, then processing proceeds from step 313 back to step 303 and this loop continues until a record has been created for each of the satellite data messages for each satellite of interest. If all records for all satellites of interest have been determined and created, then processing proceeds from step 313 to step 315 in which the mobile GPS receiver transmits through its communication transmitter the records for all satellites of interest with a coarse (elapsed) time tag which is used by the basestation in the manner described above.

The basestation receives these records from the mobile GPS receiver in step 327 shown in FIG. 4B. Contemporaneously with the operation of the mobile GPS receiver, the basestation is typically tracking and demodulating GPS data messages and applying time tags to those data messages in order to in effect time stamp these data messages; this is performed in step 321 as shown in FIG. 4B. Then in step 323, the basestation differentially decodes the data to provide the base's data which will be used in the correlation operation in step 325. The received data from the mobile GPS receiver will typically be stored for the correlation operation and compared against the stored differentially decoded data from step 323. In step 325, the basestation correlates the base's data against the record from the mobile GPS receiver for the first (or the next, if not the first) satellite. In step 327, the basestation finds and interpolates the peak location which indicates the time of arrival at the mobile receiver of the satellite data message from the current satellite being processed. In step 329, the basestation determines if correlation has been performed for all records received from the mobile receiver. If not, then processing proceeds back to step 325 in which the next record for the next satellite data message is processed in steps 325 and 327. If in step 329, it has been determined that correlation has been performed for all records received from the mobile GPS receiver, then in step 331, a comparison is made between the determined times for different satellites of interest. In step 333, the basestation uses majority logic to discard erroneous or ambiguous data. Then in step 335, the basestation determines if all data is ambiguous or erroneous. If so, the basestation commands the mobile receiver in step 337 to acquire more data and the entire process will be repeated starting from the method shown in FIG. 4A and continuing to the method shown in FIG. 4B. If all data is not ambiguous as determined in step 335, then the basestation performs a weighted average of the times in step 339 and uses this weighted average with the pseudoranges transmitted from the mobile GPS receiver, at least in some embodiments, in order to determine a position information of the mobile GPS receiver.

In order to illustrate the processing steps just described a live GPS signal was sampled, collected into a record, despread and sampled at a rate of 4 samples per symbol period. FIG. 10A shows a 1 second record of the real portion of the despread waveform with carrier partially removed. The symbol pattern is evident, but a small residual carrier offset of about 1 Hz is obviously still present. FIG. 10B shows the signal differentially detected by multiplying it by a conjugated and delayed version of itself with delay equal to 20 milliseconds. The symbol pattern is clearly evident. FIG. 10C shows the ideal data signal and FIG. 10D shows the cross-correlation of the ideal signal (e.g. produced at the basestation) and the signal of 10B. Note the glitches in 10B that result from sampling effects and the nonideal nature of the signal due to noise, etc.

FIG. 11A shows the demodulated data when noise was added to the signal so that the SNR of the demodulated signal is approximately 0 dB. This models the situation when the received GPS signal is reduced in power by over 15 dB relative to its nominal level, e.g. by blockage conditions. FIG. 11B shows the differentially demodulated data. The bit pattern is undetectable. Finally FIG. 11C shows the cross-correlation of this noise signal with the clean reference. Obviously the peak is still strong, with peak to RMS level in excess of 5.33 (14.5 dB), allowing accurate time-of-arrival estimation. In fact, an interpolation routine applied about the peak of this signal indicated an accuracy of less than $1/16$ sample spacing, i.e. less than 0.3 msec.

As mentioned previously, the basestation can send to the remote the data sequence together with the time associated with the beginning of this message. The remote can then estimate the time-of-arrival of the data message via the same cross-correlation methods described above except that these correlation methods are performed at the remote. This is useful if the remote computes its own position location. In this situation the remote may also obtain satellite ephemeris data by a transmission of such data from the basestation.

Figure 1B:
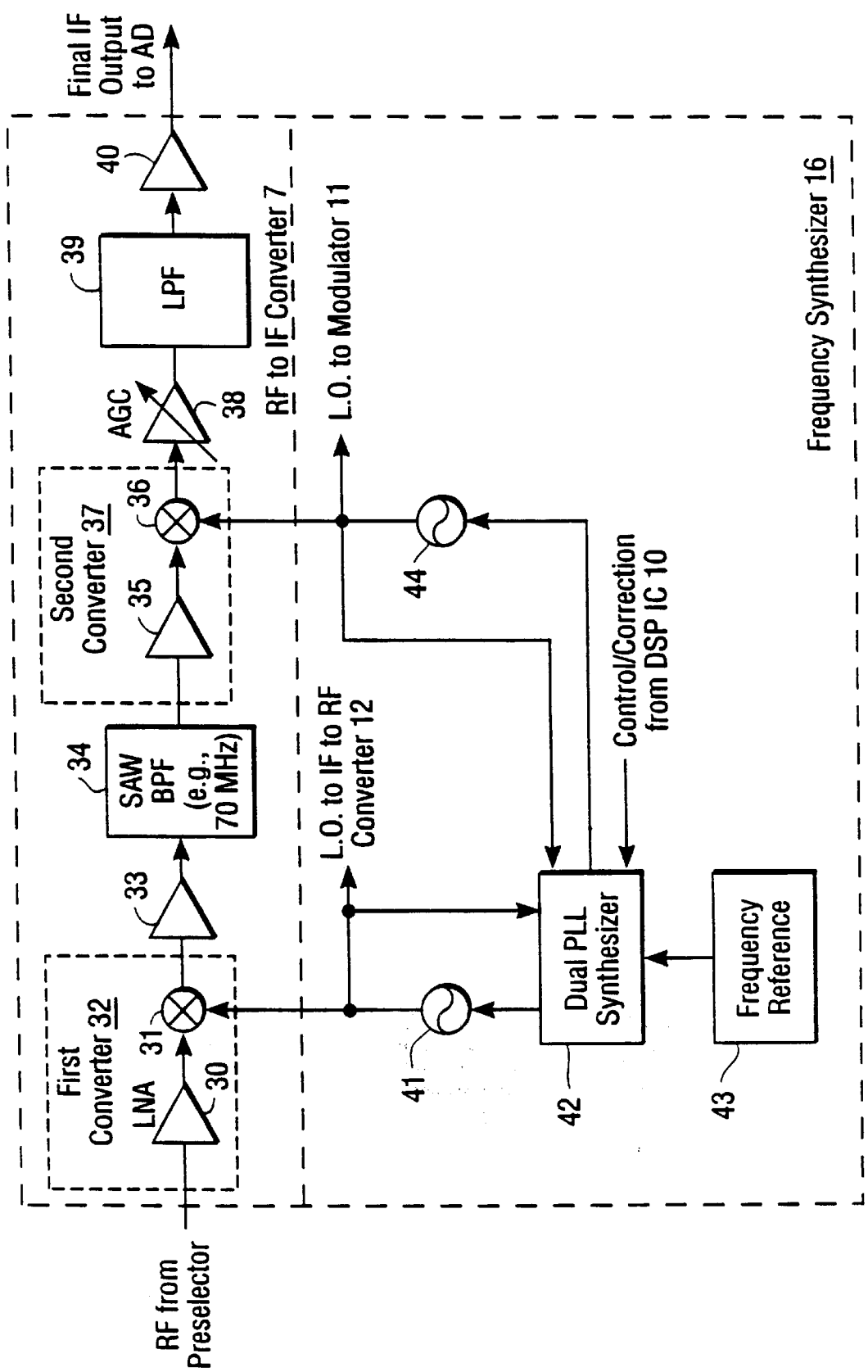
FIG. 1B shows a block diagram of a typical implementation for the RF to IF converter and frequency synthesizer of FIG. 1A.

FIG. 1A shows an example of a combined mobile GPS receiver and communication system which may be used with the present invention. This combined mobile GPS receiver and communication system 100 has been described in detail in copending application Ser. No. 08/652,833 filed May 23, 1996 and entitled "Combined GPS Positioning System and Communication System Utilizing Shared Circuitry" which is hereby incorporated herein by reference (now U.S. Pat. No. 6,002,363). FIG. 1B illustrates in further detail the RF to IF converter 7 and the frequency synthesizer 16 of FIG. 1A. These components shown in FIG. 1B are also described in copending application Ser. No. 08/652,833. The mobile GPS receiver and communication system 100 shown in FIG. 1A may be configured to perform a particular form of digital signal processing on stored GPS signals in such a manner that the receiver has very high sensitivity. This is further described in copending U.S. patent application Ser. No. 08/612,669, which was filed Mar. 8, 1996, and is entitled "An Improved GPS Receiver and Method for Processing GPS Signals", and this application is hereby incorporated herein by reference. This processing operation described in application Ser. No. 08/612,669 computes a plurality of intermediate convolutions typically using fast Fourier transformations and stores these intermediate convolutions in the digital memory and then uses these intermediate convolutions to provide at least one pseudorange. The combined GPS and communication system 100 shown in FIG. 1A also may incorporate certain frequency stabilization or calibration techniques in order to further improve the sensitivity and accuracy of the GPS receiver. These techniques are described in copending application Ser. No. P003X, which was filed Dec. 4, 1996, and is entitled "An Improved GPS Receiver Utilizing a Communication Link", and which application is hereby incorporated herein by reference (now U.S. Pat. No. 5,841,396).

Rather than describing in detail the operation of the combined mobile GPS receiver and communication system 100 shown in FIG. 1A, a brief summary will be provided here. In a typical embodiment, the mobile GPS receiver and communication system 100 will receive a command from a basestation, such as basestation 17, which may be either one of the basestations shown in either FIG. 5A or FIG. 5B. This command is received on the communication antenna 2 and the command is processed as a digital message after stored in the memory 9 by the processor 10. The processor 10 determines that the message is a command to provide a position information to the basestation, and this causes the processor 10 to activate the GPS portion of the system at least some of which may be shared with the communication system. This includes, for example, setting the switch 6 such that the RF to IF converter 7 receives GPS signals from GPS antenna 1 rather than communication signals from the communication antenna 2. Then the GPS signals are received, digitized, and stored in the digital memory 9 and then processed in accordance with the digital signal processing techniques described in the aforementioned application Ser. No. 08/612,669. The result of this processing typically includes a plurality of pseudoranges for the plurality of satellites in view and these pseudoranges are then transmitted back to the basestation by the processing component 10 activating the transmitter portion and transmitting the pseudoranges back to the basestation to the communication antenna 2.

Figure 5A:
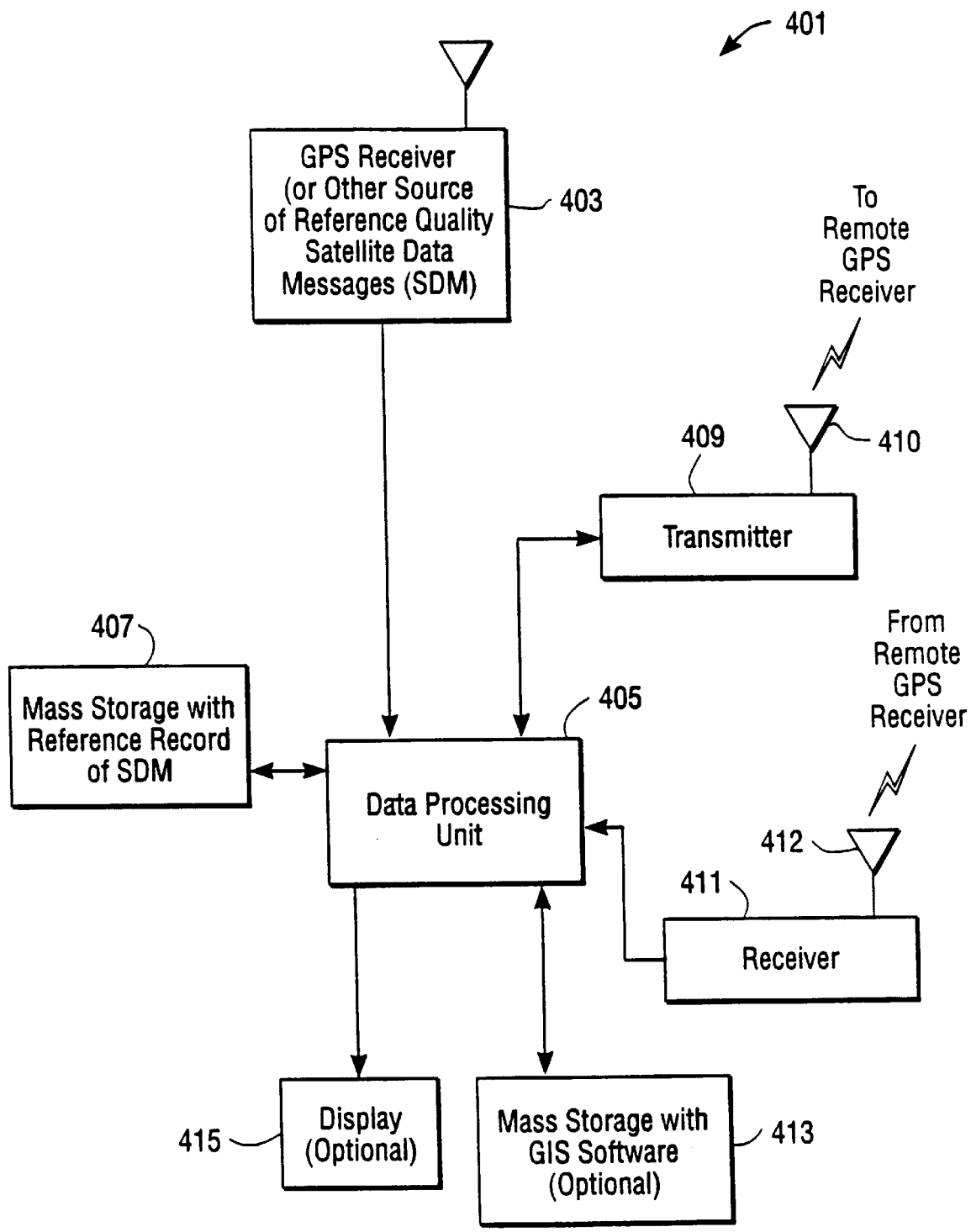
FIG. 5A shows one embodiment of a basestation of the present invention.
Figure 5B:
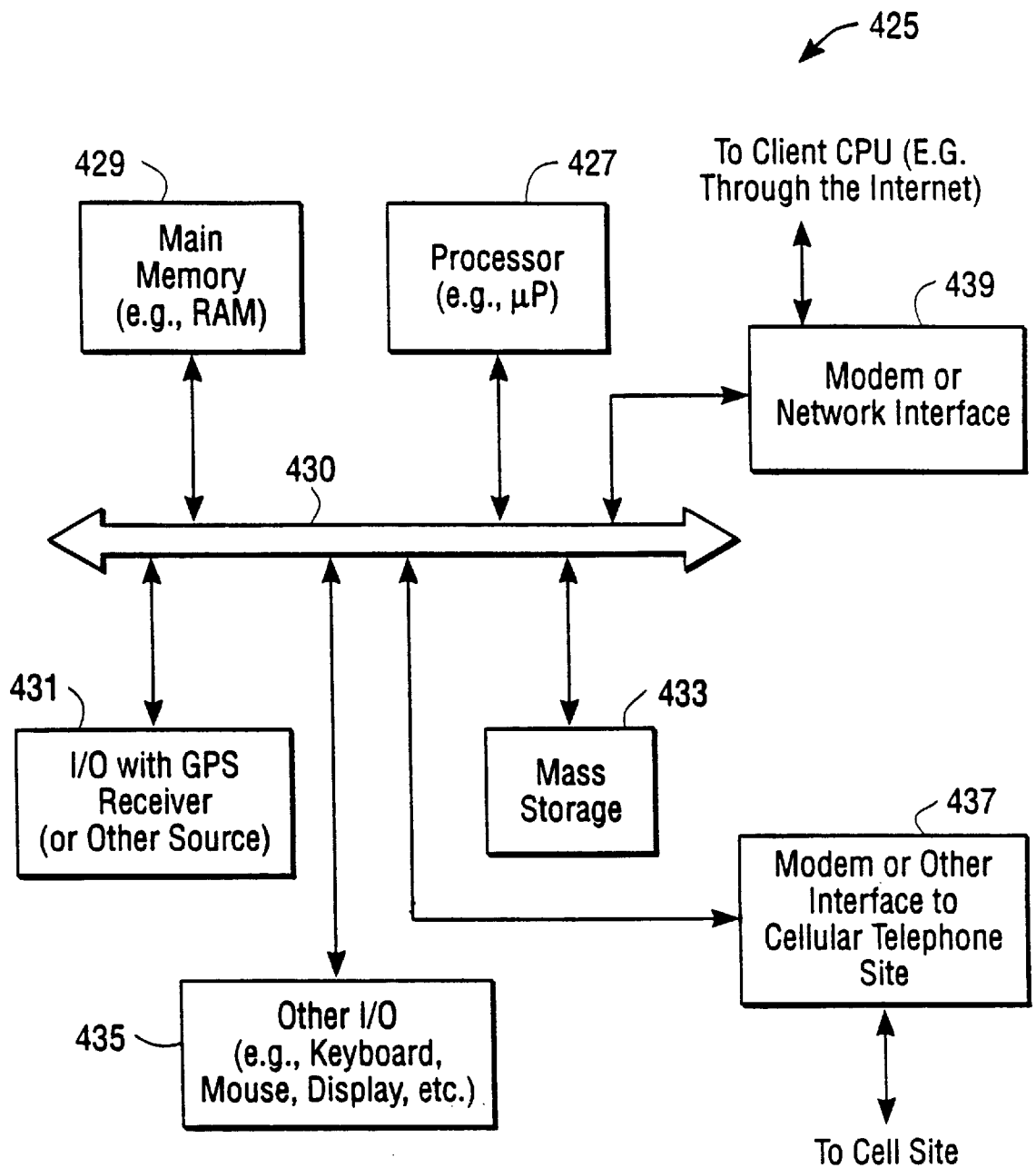
FIG. 5B shows another embodiment of a basestation of the present invention.
Figure 6:
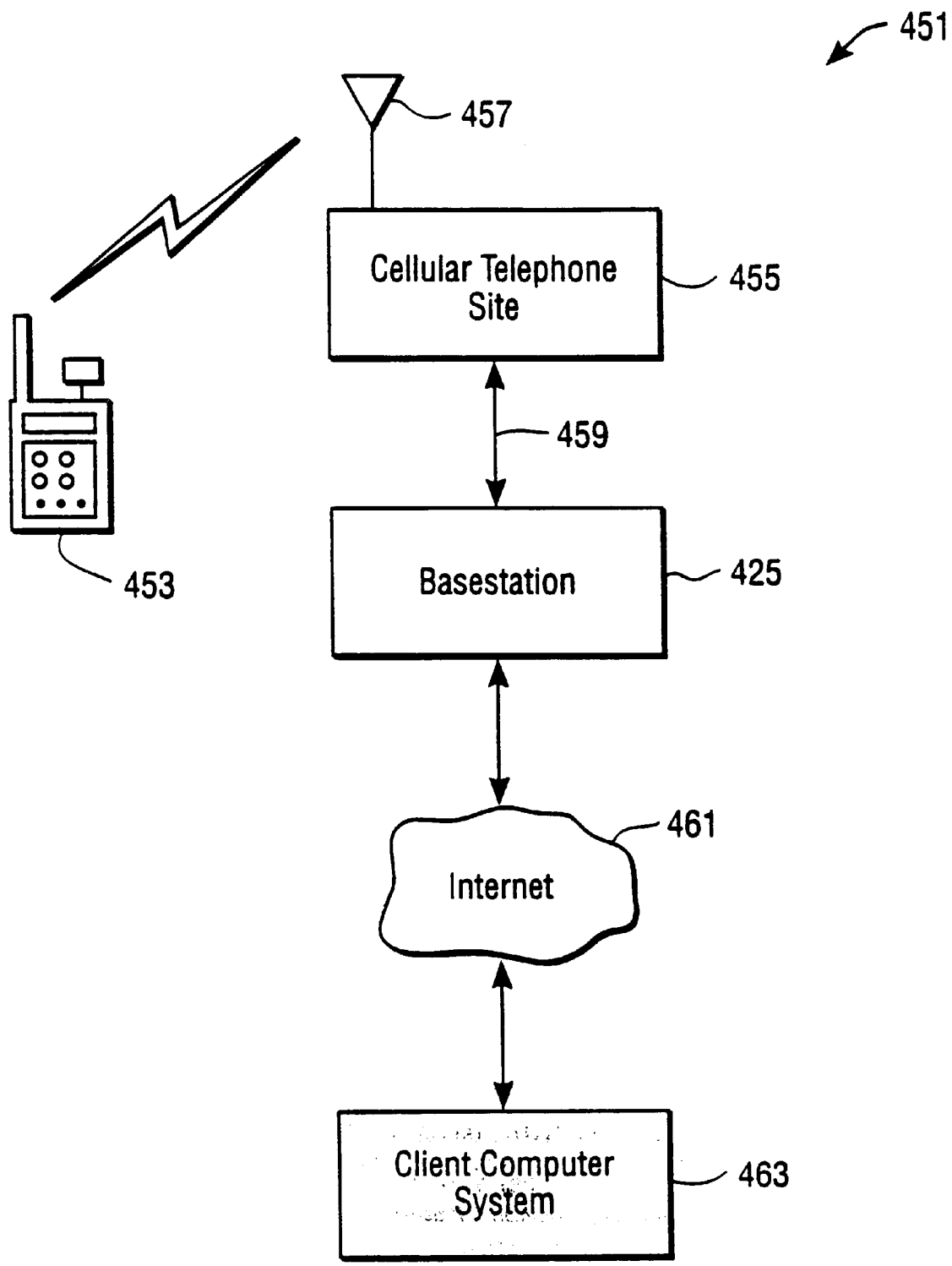
FIG. 6 shows a system of the present invention which includes an SPS receiver, a cellular telephone site, a basestation, the Internet and a client computer system.

The basestation 17 shown in FIG. 1A may be coupled directly to the remote through a radio communication link or may be, as shown in FIG. 6, coupled to the remote through a cellular telephone site which provides a wired communication link between the telephone site and the basestation. FIGS. 5A and 5B illustrate these two possible basestations.

The basestation 401 illustrated in FIG. 5A may function as an autonomous unit by providing a radio link to and from mobile GPS receivers and by processing received pseudoranges and the corresponding time records according to the present invention. This basestation 401 may find use where the basestation is located in a metropolitan area and all mobile GPS receivers to be tracked are similarly located in the same metropolitan area. For example, this basestation 401 may be employed by police forces or rescue services in order to track individuals wearing or using the mobile GPS receivers. Typically, the transmitter and receiver elements 409 and 411, respectively, will be merged into a single transceiver unit and have a single antenna. However, these components have been shown separately as they may also exist separately. The transmitter 409 functions to provide commands to the mobile GPS receivers through transmitter antenna 410; this transmitter 409 is typically under control of the data processing unit 405 which may receive a request from a user of the processing unit to determine the location of a particular mobile GPS receiver. Consequently, the data processing unit 405 would cause the command to be transmitted by the transmitter 409 to the mobile GPS receiver. In response, the mobile GPS receiver would transmit back to the receiver 411 pseudoranges and corresponding records in one embodiment of the present invention to be received by the receiving antenna 412. The receiver 411 receives these messages from the mobile GPS receiver and provides them to the data processing unit 405 which then performs the operations which derive the position information from the pseudoranges from the mobile GPS receiver and the satellite data messages received from the GPS receiver 403 or other source of reference quality satellite data messages. This is further described in the above-noted copending patent applications. The GPS receiver 403 provides the satellite ephemeris data which is used with the pseudoranges and the determined time in order to calculate a position information for the mobile GPS receiver. The mass storage 407 includes a stored version of the reference record of the satellite data messages which is used to compare against the records received from the mobile GPS receiver. The data processing unit 405 may be coupled to an optional display 415 and may be also coupled to a mass storage 413 with GIS software which is optional. It will be appreciated that the mass storage 413 may by the same as the mass storage 407 in that they may be contained in the same hard disk or other mass storage device.

FIG. 5B illustrates an alternative basestation of the present invention. This basestation 425 is intended to be coupled to remote transmitting and receiving sites such as a cellular telephone site 455 shown in FIG. 6. This basestation 425 may also be coupled to client systems through a network, such as the Internet or an intranet, or other types of computer networking systems. The use of the basestation in this manner is further described in copending application Ser. No. 08/708,176, which was filed Sep. 6, 1996 and which is entitled "Client-Server Based Remote Locator Device" and which is hereby incorporated herein by reference. The basestation 425 communicates with a mobile GPS unit, such as the combined mobile GPS receiver and communication system 453 shown in FIG. 6 through the cellular telephone site 455 and its corresponding antenna or antennas 457 as shown in FIG. 6. It will be appreciated that the combined GPS receiver and communication system 453 may be similar to the system 100 shown in FIG. 1A.

The basestation 425, as shown in FIG. 5B, includes a processor 427 which may be a conventional microprocessor coupled by a bus 430 to main memory 429 which may be random access memory (RAM). The basestation 425 further includes other input and output devices, such as keyboards, mice, and displays 435 and associated I/O controllers coupled via bus 430 to the processor 427 and to the memory 429. A mass storage device 433, such as a hard disk or CD ROM or other mass storage devices, is coupled to various components of the system, such as processor 427 through the bus 430. An I/O controller 431 which serves to provide I/O control between the GPS receiver or other source of satellite data messages, is also coupled to the bus 430. This I/O controller 431 receives satellite data messages from the GPS receiver 430 and provides them through the bus 430 to the processor which causes the time stamp to be applied to them and then stored in the mass storage device 433 for use later in comparing to records received from mobile GPS receivers. Two modems 439 and 437 are shown in FIG. 5B as interfaces to other systems remotely located from the basestation 425. In the case of modem or network interface 439, this device is coupled to a client computer, for example, through the Internet or some other computer network. The modem or other interface 437 provides an interface to the cellular telephone site, such as the site 455 shown in FIG. 6 which illustrates a system 451.

The basestation 425 may be implemented with other computer architectures as will be appreciated by those skilled in the art. For example, there may be multiple busses or a main bus and a peripheral bus or there may be multiple computer systems and/or multiple processors. It may be advantageous, for example, to have a dedicated processor to receive the satellite data message from the GPS receiver 403 and process that message in order to provide a reference record in a dedicated manner such that there will be no interruption in the process of preparing the reference record and storing it and managing the amount of stored data in accordance with the present invention.

The system 451 shown in FIG. 6 will typically operate, in one embodiment, in the following manner. A client computer system 463 will transmit a message through a network, such as the Internet 461 to the basestation 425. It will be appreciated that there may be intervening routers or computer systems in the network or Internet 461 which pass along the request for position of a particular mobile GPS receiver. The basestation 425 will then transmit a message through a link, which is typically a wired telephone link 459, to the cellular telephone site 455. This cellular telephone site 455 then transmits a command using its antenna or antennas 457 to the combined mobile GPS receiver and communication system 453. In response, the system 453 transmits back pseudoranges and records of the satellite data messages in accordance with the present invention. These records and pseudoranges are then received by the cellular telephone site 455 and communicated back to the basestation through link 459. The basestation then performs the operations as described according to the present invention using the records to determine the time of receipt of the satellite data messages and using pseudoranges from the remote GPS system 453 and utilizing the satellite ephemeris data from the GPS receiver at the basestation or from other sources of GPS data. The basestation then determines a position information and communicates this position information through a network, such as the Internet 461, to the client computer system 453 which may itself have mapping software at the client computer system, allowing the user of this system to see on a map the exact position of the mobile GPS system 453.

There are several methods for determining an estimated time when GPS signals were received at a mobile GPS system. The mobile, when sending the pattern to the server, may begin a timer and wait for an acknowledge from the server. If the acknowledgment of receipt is very lengthy, then the pattern may be resent together with the time offset between successive transmissions. This may be continued until the acknowledgment is received within an acceptable time period (say within one second). Effectively, this method is determining transmission delay and retransmitting a pattern for matching if the transmission delay is above a predetermined amount (e.g. the delay is more than the acceptable time period). This transmission delay establishes a comparison range for a comparison of the two patterns.

Alternatively, the mobile and server may initially establish a coarse time coordination, for example to 1 second or better accuracy, by means of a round trip signal. The server may send time-of-day to the mobile, which records this time and sends an acknowledgment to the server. If the acknowledgment is received within a prescribed period of time T, then it is obviously the case that the time recorded at the mobile is within T seconds of that of the server. Then, when the mobile processes GPS information to create the data pattern to be sent to the server, the time of such processing may be tagged to an accuracy with T seconds. Hence, when estimated GPS data information is sent to the server, the server need only examine offsets in time, within a range no greater than T, between the pattern received from the mobile and a reference pattern (e.g. received by a local GPS receiver or another data feed). The coarse time coordination can also be done by the mobile sending its local version of the time of processing to the server and the server sending an acknowledgment response. The server can associate the received mobile's time with its own time to determine an offset (sometimes called a bias). If this round trip time is within T seconds, then subsequent transmissions of patterns to the server from the mobile, time tagged with the mobile's local time, will again allow the server to restrict its search range to less than T seconds. In this manner, the server can restrict the range of comparison.

It should be appreciated that the same approach to coarse time coordination between the mobile and server may be done if the pattern match operation is performed at the mobile rather than at the server. Once the server and mobile establish coarse time with respect to one another, to an amount no greater than T seconds, then subsequent pattern match operations performed at the mobile need not be performed over ranges greater than T seconds.

Other variations in the above procedure are possible. Instead of sending data back and forth and measuring receipt time of data, it is possible in some circumstances to send electrical pulses or other timing signals between the mobile and the server or some other entity to which the server may communicate. The pulses or signals may then provide the means to roughly coordinate time between the mobile and server. The mobile and the server may be able to get a rough knowledge of time by receipt of a signal or signals separate from its communications with the server. For example, each may receive a time-of-day broadcast signal from another communications signal, such as WWV. The mobile and server may both view a common radio signal and agree upon a particular epoch associated with that signal in order to establish a coarse common time.

Figure 12A:
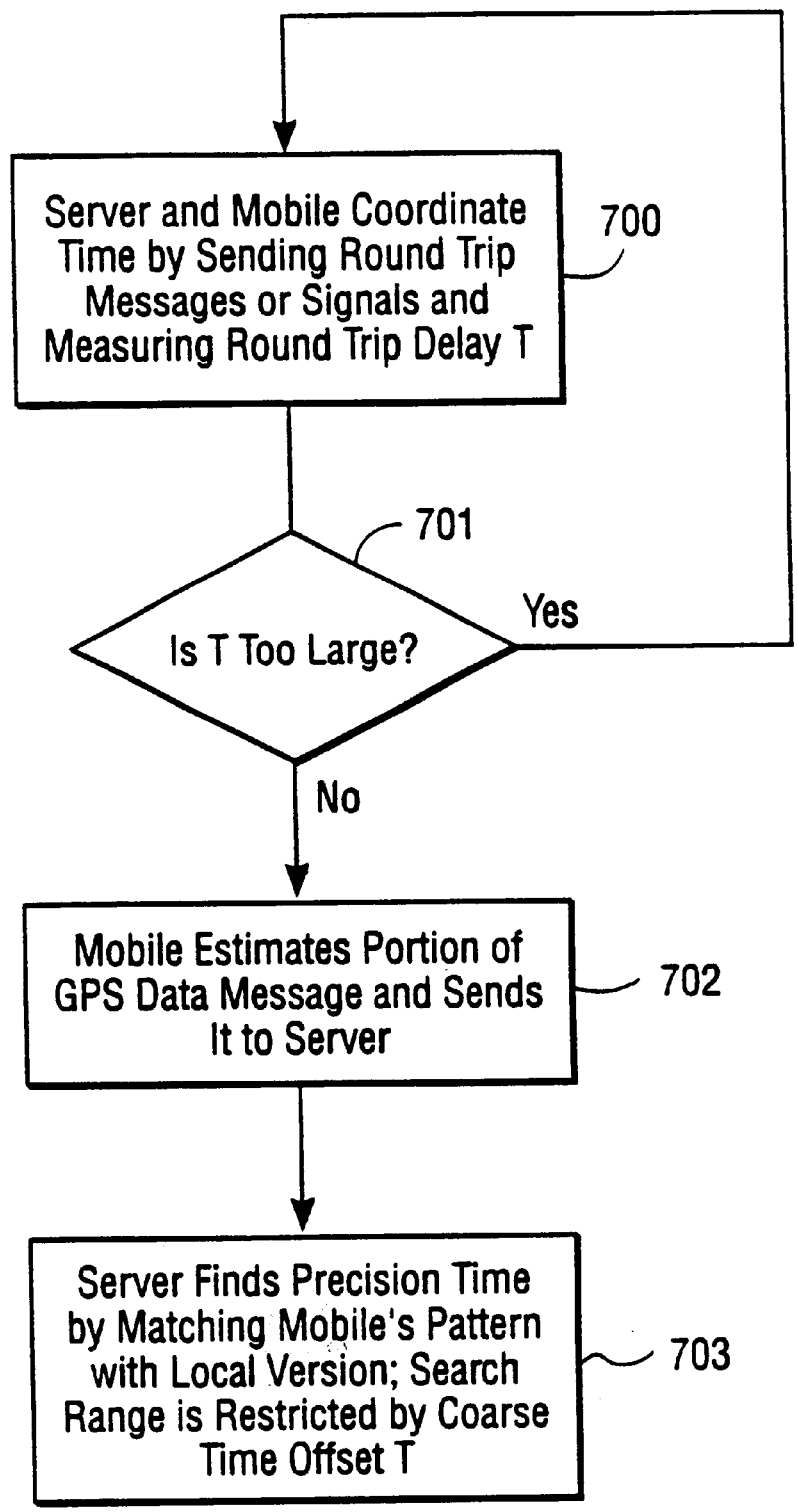
FIG. 12A shows an example of a coarse time coordination method according to one embodiment of the present invention.

FIG. 12A shows an overall block diagram of the coarse time coordination method followed by the pattern match, where the final pattern matching operation is done at the server. A similar block diagram corresponds to the pattern matching done at the mobile and is shown in FIG. 12B.

In FIG. 12A, the server and the mobile perform time coordination in operation 700 by sending round trip messages or signals and by measuring the round trip delay (referred to as T seconds). This measurement is used to determine whether T is too large (e.g. more than 30 seconds) in operation 701. If the delay is too long, the operation 700 may be repeated (or alternative methods, discussed above, for time coordination between the mobile and server may be used). If the delay T is not too large, operation 702 is performed; this operation 702 is similar to operation 203 of FIG. 2 of the Parent Patent. In operation 703, the server (e.g. basestation 425 of FIG. 6 of the Parent Patent) performs a correlation operation to determine a precision time by matching the pattern/record transmitted by the mobile with the server's version. The server selects a particular portion (a "search window") of its version of the pattern by using the delay T to determine this portion. That is, the server will time stamp the receipt of the pattern from the mobile and subtract the delay T to determine a coarse time CT (which specifies coarsely when the mobile received the SPS signals which created the pattern transmitted by the mobile). This coarse time is used to create a search window (window= CT−delta to CT+delta) to select the server's record in that window which is compared to the pattern received from the mobile unit.

Figure 12B:
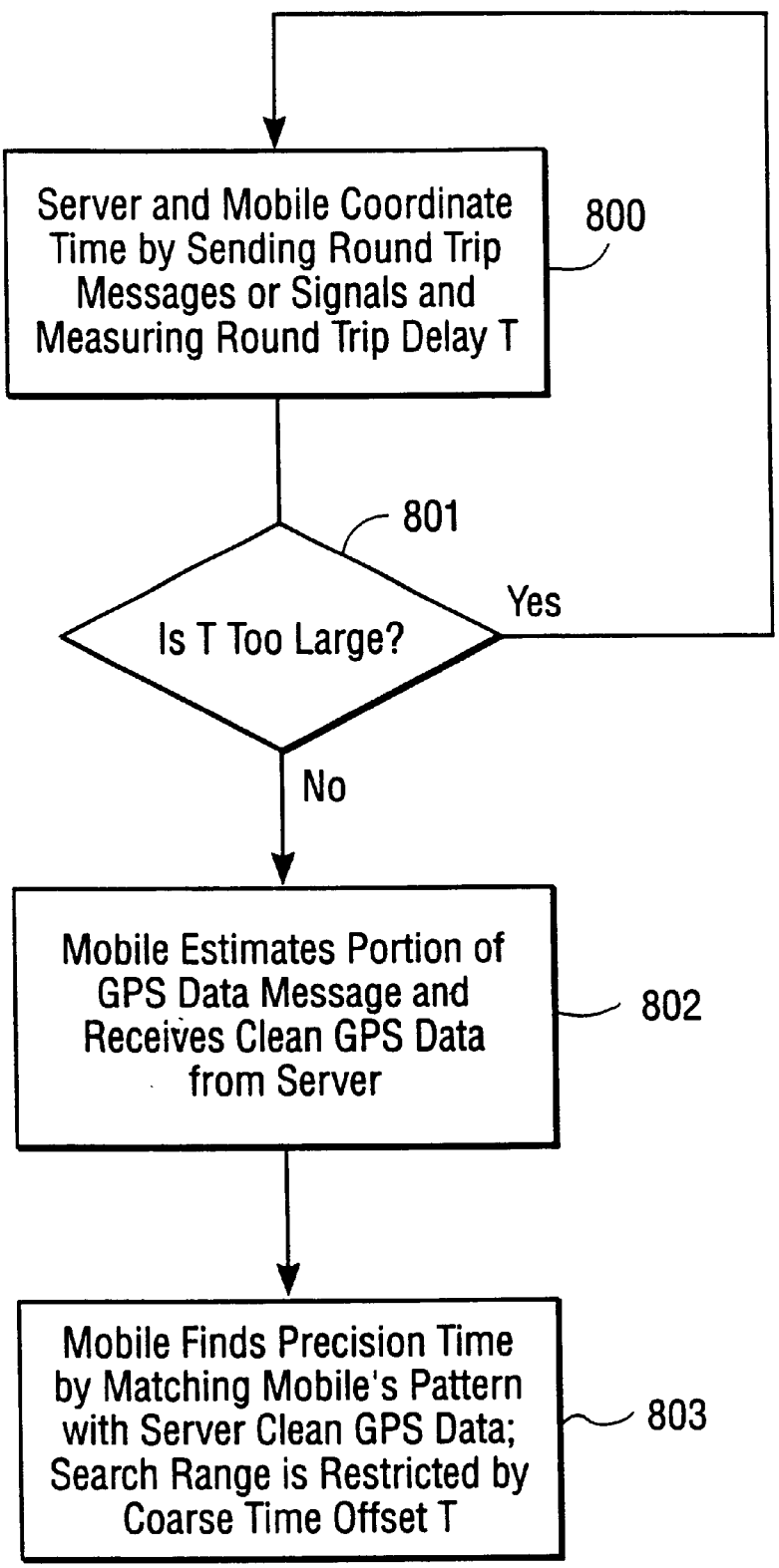
FIG. 12B shows another example of a coarse time coordination method according to another embodiment of the present invention.

In FIG. 12B, a series of operations (800–803), which are similar to the operations 700–703, are performed except that the mobile performs the pattern matching operation (rather than the server performing this operation).

The present invention has been described with reference to various figures which have been provided for purposes of illustration and are not intended to limit in any way the present invention. Moreover, various examples have been described of the methods and apparatuses of the present invention, and it will be appreciated that these examples may be modified in accordance with the present invention and yet fall within the scope of the following claims.

What is claimed is:

1. A mobile satellite positioning system (SPS) receiver comprising:
    means for receiving at said mobile SPS receiver a first record of at least a portion of a satellite data message;
    means for receiving at said mobile SPS receiver a second record of said satellite data message;
    means for determining a comparison range;
    means for comparing said first record with said second record at least in said comparison range determined from an estimated time when said first record was received at said mobile SPS receiver;
    means for determining a time from said comparing, said time indicating when said first record was received at said mobile SPS receiver.

2. An SPS receiver as in claim 1 wherein said second record provides time of day information such that said time may be determined from said second record.

3. An SPS receiver as in claim 2 wherein said second record is received from a basestation.

4. An SPS receiver as in claim 3 further comprising means for receiving satellite ephemeris information at said mobile SPS receiver.

5. An SPS receiver as in claim 4 wherein said satellite ephemeris information is received from said basestation.

6. An SPS receiver as in claim 2 further comprising means for receiving SPS signals and determining a plurality of pseudoranges and wherein said determining of said comparison range comprises one of transmitting a first message from said SPS receiver to a remote basestation or receiving a second message from said remote basestation.

7. An SPS receiver as in claim 6 wherein said first record is obtained by removing a PN code from said satellite data message.

8. A mobile satellite positioning system (SPS) receiver comprising:
    an antenna for receiving SPS signals;
    a demodulator coupled to said antenna, said demodulator removing a PN code from said SPS;
    a processor coupled to said demodulator, said processor determining a first record of at least a portion of a satellite data message received from said demodulator and determining a comparison range;
    a communication antenna;
    a communication receiver coupled to said communication antenna and to said processor, said communication receiver receiving a second record of said satellite data message, said processor comparing said first record and said second record at least in said comparison range determined from an estimated time when said first record was received at said mobile SPS receiver and determining a time indicating when said first record was received.

9. A mobile SPS receiver as in claim 8 wherein said second record provides time of day information such that said time may be determined from said second record.

10. A mobile SPS receiver as in claim 9 wherein said second record is received from a basestation.

11. A mobile SPS receiver as in claim 10 wherein said communication receiver receives satellite ephemeris information.

12. A mobile SPS receiver as in claim 11 wherein said satellite ephemeris information is provided from said basestation.

13. A mobile SPS receiver as in claim 9 wherein said mobile SPS receiver determines pseudoranges.

14. A method for assisting in the measurement of time related to satellite data messages for use with a satellite positioning system (SPS), said method comprising:
    transmitting from a transmitter a second record of a satellite data message for use in comparing to a first record of at least a portion of a satellite data message, said transmitter transmitting a message which is used to determine a comparison range for comparing said first record to said second record, said comparison range being based on an estimated time when said first record was received at a remote mobile SPS receiver.

15. A machine readable medium which provides executable computer program instructions which when executed cause a processing system to perform a method for assisting in the measurement of time related to satellite data messages for use with a satellite positioning system (SPS), said method comprising:
    transmitting from a transmitter a second record of a satellite data message for use in comparing to a first record of at least a portion of a satellite data message, said transmitter transmitting a message which is used to determine a comparison range for comparing said first record to said second record, said comparison range being based on an estimated time when said first record was received at a remote mobile SPS receiver.

16. A machine readable medium which provides executable computer program instructions which when executed cause a processing system to perform a method, in a mobile satellite positioning system (SPS) receiver, for measuring time related to satellite data messages with use with an SPS, said method comprising:
    receiving at said mobile SPS receiver a first record of at least a portion of a satellite data message;
    receiving at said mobile SPS receiver a second record of said satellite data message;

determining a comparison range;

comparing said first record with said second record at least in said comparison range determined from an estimated time when said first record was received at said mobile SPS receiver;

determining a time from said comparing, said time indicating when said first record was received at said mobile SPS receiver.

17. A machine readable medium as in claim 16 wherein said second record provides time of day information such that said time may be determined from said second record.

18. A machine readable medium as in claim 17 wherein said second record is received from a basestation.

19. A machine readable medium as in claim 18, said method further comprising receiving satellite ephemeris information at said mobile SPS receiver.

20. A machine readable medium as in claim 19 wherein said satellite ephemeris information is received from said basestation.

21. A machine readable medium as in claim 17, said method further comprising receiving SPS signals and determining a plurality of pseudoranges and wherein said determining of said comparison range comprises one of transmitting a first message from said SPS receiver to a remote basestation or receiving a second message from said remote basestation.

22. A machine readable medium as in claim 21 wherein said first record is obtained by removing a PN code from said satellite data message.

* * * * *